(12) United States Patent
Yoon et al.

(10) Patent No.: US 9,714,024 B2
(45) Date of Patent: Jul. 25, 2017

(54) METHOD AND APPARATUS FOR CONTROLLING HYBRID ELECTRIC VEHICLE

(71) Applicants: Hyundai Motor Company, Seoul (KR); Kia Motors Corporation, Seoul (KR)

(72) Inventors: Dong Pil Yoon, Incheon (KR); Jeamun Lee, Seoul (KR); Kwang Hun Choi, Gyeonggi-Do (KR); Tae Soo Kim, Incheon (KR); Kyu Hwan Jo, Seoul (KR); Jungwook Kim, Suwon (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 23 days.

(21) Appl. No.: 14/961,229

(22) Filed: Dec. 7, 2015

(65) Prior Publication Data
US 2017/0096134 A1    Apr. 6, 2017

(30) Foreign Application Priority Data

Oct. 6, 2015 (KR) .................. 10-2015-0140438

(51) Int. Cl.
*G01C 21/34* (2006.01)
*B60W 20/13* (2016.01)
(Continued)

(52) U.S. Cl.
CPC .............. *B60W 20/13* (2016.01); *B60K 6/442* (2013.01); *B60K 6/547* (2013.01); *B60W 10/06* (2013.01);
(Continued)

(58) Field of Classification Search
CPC .......... B60L 11/00; B60L 11/02; B60L 11/18; B60W 20/00; B60W 20/13; B60W 20/14
(Continued)

(56) References Cited

U.S. PATENT DOCUMENTS

| 5,778,326 A | * | 7/1998 | Moroto | B60K 6/485 |
| | | | | 180/65.26 |
| 6,098,733 A | * | 8/2000 | Ibaraki | B60K 6/543 |
| | | | | 180/65.28 |

(Continued)

FOREIGN PATENT DOCUMENTS

EP    2543965 A2    1/2013
JP    2001-169408 A    6/2001
(Continued)

OTHER PUBLICATIONS

European Search Report for European Patent Application No. 15197102.5, dated Mar. 10, 2017, 7 pages.

*Primary Examiner* — Thomas G Black
*Assistant Examiner* — Wae Louie
(74) *Attorney, Agent, or Firm* — Mintz Levin Cohn Ferris Glovsky and Popeo, P.C.; Peter F. Corless

(57) ABSTRACT

A method and an apparatus for controlling a hybrid electric vehicle are provided. The apparatus includes a navigation device that provides information regarding a gradient, a speed limit, and a traffic speed of a road. An accelerator pedal position detector detects a position of an accelerator pedal and a brake pedal position detector detects a position of a brake pedal. A vehicle speed detector detects a vehicle speed, a state of charge (SOC) detector detects an SOC of a battery, and a gear stage detector detects a gear stage that is currently engaged. A controller operates the hybrid vehicle based on signals of the navigation device, the accelerator pedal position detector, the brake pedal position detector, the
(Continued)

vehicle speed detector, the SOC detector, and the gear stage detector.

18 Claims, 11 Drawing Sheets

(51) Int. Cl.
    *B60K 6/442*      (2007.10)
    *B60K 6/547*      (2007.10)
    *B60W 10/06*      (2006.01)
    *B60W 10/08*      (2006.01)

(52) U.S. Cl.
    CPC ............ *B60W 10/08* (2013.01); *G01C 21/34* (2013.01); *B60Y 2200/92* (2013.01); *B60Y 2300/182* (2013.01); *B60Y 2300/18008* (2013.01); *Y10S 903/93* (2013.01)

(58) Field of Classification Search
    USPC ....... 701/22, 400, 410, 532, 541; 180/65.26, 180/65.27
    See application file for complete search history.

(56) References Cited

U.S. PATENT DOCUMENTS

| | | | |
|---|---|---|---|
| 6,230,496 B1 | 5/2001 | Hofmann et al. | |
| 7,659,698 B2 | 2/2010 | Elder et al. | |
| 8,036,785 B2 * | 10/2011 | Maguire | B60K 6/48 701/123 |
| 8,301,323 B2 * | 10/2012 | Niwa | B60K 6/365 701/22 |
| 8,335,605 B2 * | 12/2012 | Mueller | B60W 10/26 701/22 |
| 2010/0049397 A1 | 2/2010 | Liu et al. | |
| 2014/0046595 A1 * | 2/2014 | Segawa | G01C 21/34 701/541 |
| 2014/0088810 A1 | 3/2014 | Gehring et al. | |
| 2014/0180519 A1 * | 6/2014 | Niimi | B60K 6/445 701/22 |
| 2015/0134174 A1 * | 5/2015 | Preece | H01M 10/44 701/22 |
| 2016/0107527 A1 * | 4/2016 | Amano | B60L 7/14 701/22 |
| 2016/0153796 A1 * | 6/2016 | Stankoulov | G01C 21/3469 701/123 |
| 2017/0021730 A1 * | 1/2017 | Ogawa | B60L 7/20 |
| 2017/0021821 A1 * | 1/2017 | Ogawa | B60W 20/13 |
| 2017/0028981 A1 * | 2/2017 | Ogawa | B60K 6/445 |

FOREIGN PATENT DOCUMENTS

| | | |
|---|---|---|
| KR | 10-0792893 B1 | 1/2008 |
| KR | 10-1542988 B1 | 8/2015 |
| WO | 2015/019142 A1 | 2/2015 |

* cited by examiner

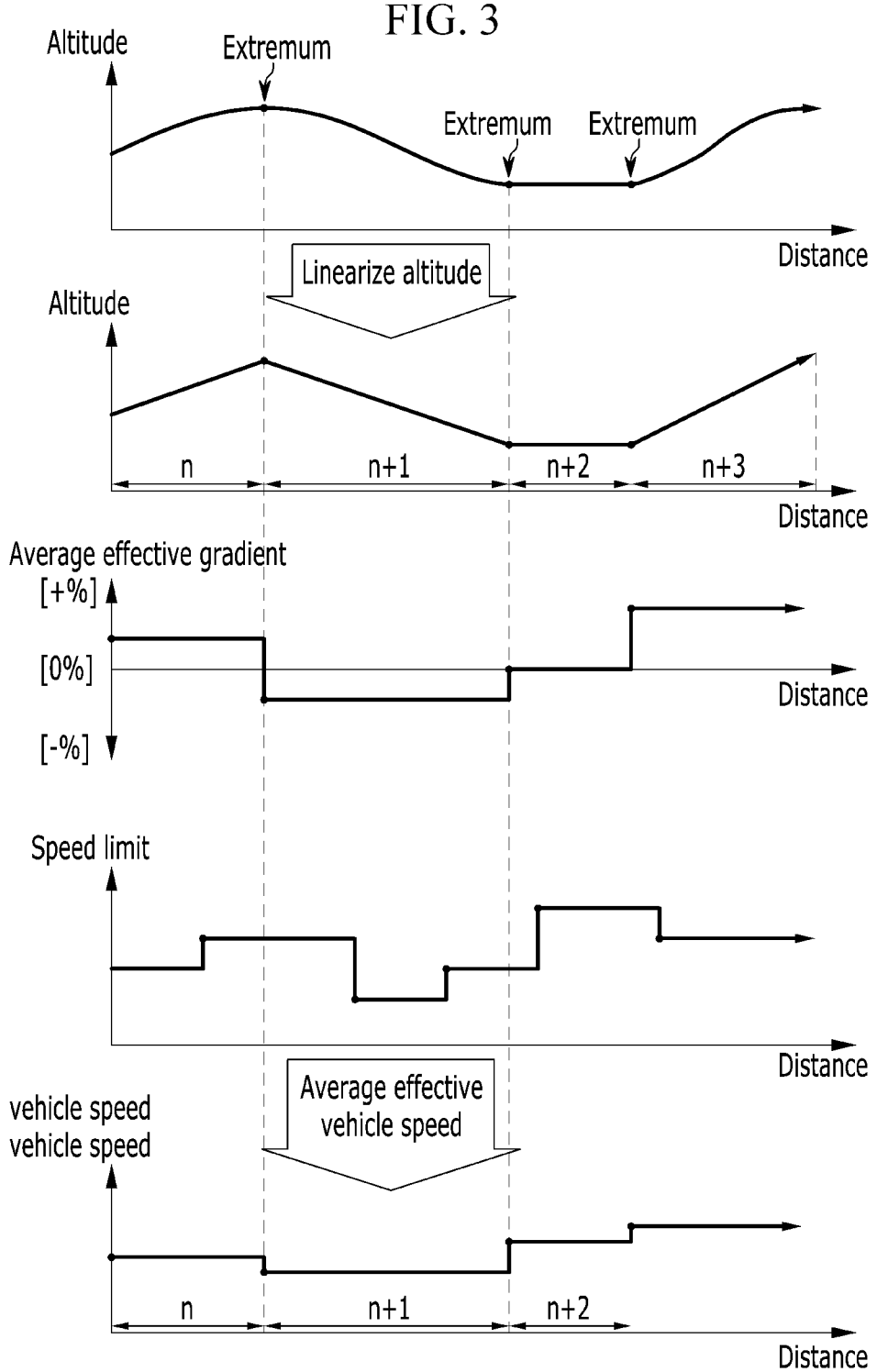

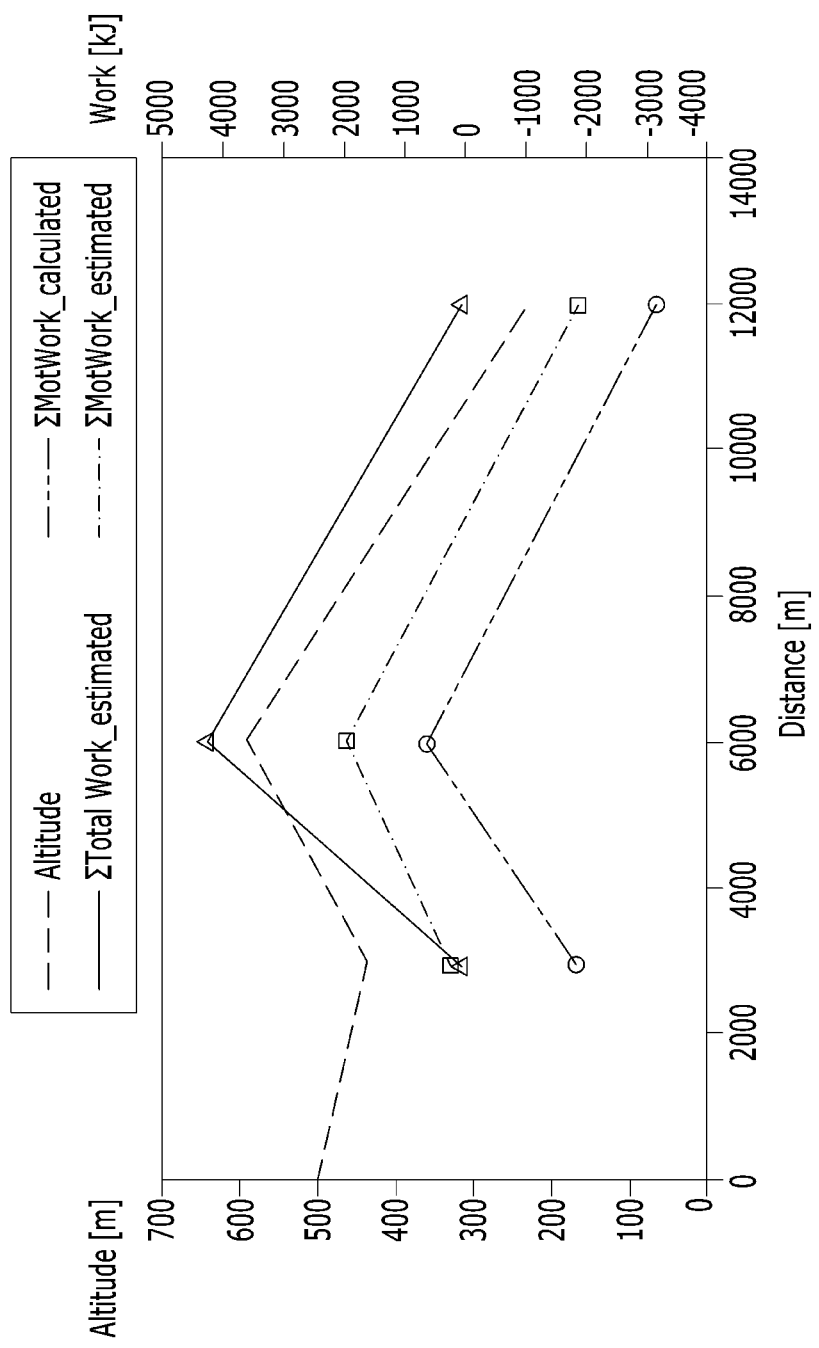

METHOD AND APPARATUS FOR CONTROLLING HYBRID ELECTRIC VEHICLE

CROSS-REFERENCE TO RELATED APPLICATION

This application claims priority to and the benefit of Korean Patent Application No. 10-2015-0140438 filed in the Korean Intellectual Property Office on Oct. 6, 2015, the entire contents of which are incorporated herein by reference.

BACKGROUND (a) Field of the Invention

The present invention relates to a method and an apparatus for controlling a hybrid electric vehicle, and more particularly, to a method and an apparatus for controlling a hybrid electric vehicle that optimize driving energy of the hybrid electric vehicle in an entire route.

(b) Description of the Related Art

As is generally known in the art, a hybrid electric vehicle uses an internal combustion engine and a battery power source together. In other words, the hybrid electric vehicle efficiently combines and uses torque of the internal combustion engine and torque of a motor. In general, the hybrid electric vehicle includes an engine, a motor, an engine clutch that selectively connects the engine and the motor, a transmission, a differential gear device, a battery, a hybrid starter & generator (HSG) configured to start the engine or generate power based on an output of the engine, and wheels. The HSG may refer to an integrated starter & generator (ISG).

Further, the hybrid electric vehicle provides driving in an electric vehicle (EV) mode in which torque of the motor is used; a hybrid electric vehicle (HEV) mode in which toque of the engine is used as main torque and torque of the motor is used as auxiliary torque, by engaging or releasing the engine clutch based on acceleration intention and deceleration intention, a vehicle speed, a state of charge (SOC) of the battery, and the like; and a regenerative braking mode in which braking and inertial energy are recovered through electrical power generation of the motor while braking the vehicle or during deceleration of the vehicle by inertia to be charged in the battery. Since the hybrid electric vehicle uses both mechanical energy of the engine and electrical energy of the battery, uses optimal operation sections of the engine and the motor, and recovers the energy upon braking, fuel efficiency may be improved and the energy may be efficiently used.

According to a method for controlling a hybrid electric vehicle of the related art, to satisfy a demand torque of a driver, a torque of an engine and a torque of a motor are determined to operate the engine at an optimal operating point, thereby enabling efficient driving at a current time. However, since the conventional method does not completely reflect a change of the driving energy due to a change of a road gradient or a change in vehicle speed, it is inefficient in consideration of an entire driving route. For example, when entering an uphill or a low speed section, when a state of charge (SOC) of a battery is low, an available torque of the motor is insufficient, and excessive control is performed to satisfy the demand torque of the driver. As a result, drivability may be deteriorated. In addition, when entering a downhill or a high speed section, when the SOC of the battery is high, a charging available SOC is insufficient, and thus, regenerative braking energy may be wasted.

The above information disclosed in this section is merely for enhancement of understanding of the background of the invention and therefore it may contain information that does not form the prior art that is already known in this country to a person of ordinary skill in the art.

SUMMARY

The present invention provides a method and apparatus for controlling a hybrid electric vehicle having advantages of optimizing driving energy of the hybrid electric vehicle in an entire route.

A method of controlling a hybrid electric vehicle according to an exemplary embodiment of the present invention may include: setting a route from a current position of the hybrid electric vehicle toward a destination; setting a plurality of sections based on information regarding an altitude of the route; calculating an expected driving force for each section based on a distance for each section, an average effective gradient for each section, and an average effective vehicle speed for each section; determining an expected gear stage for each section based on the average effective gradient for each section and the average effective vehicle speed for each section; calculating an expected demand torque of a driver for each section based on the expected driving force for each section and the expected gear stage for each section; and calculating an expected input speed of a transmission for each section based on the average effective vehicle speed for each section and the expected gear stage for each section.

Additionally, the method may include calculating a demand torque of an engine for each section and a demand torque of a motor for each section from the expected demand torque of the driver for each section with reference to an optimal operating point of the engine; calculating demand power of the motor for each section based on the demand torque of the motor for each section calculated with reference to the optimal operating point of the engine and the expected input speed of the transmission for each section; calculating a state of charge (SOC) gain for each section based on the demand power of the motor for each section calculated with reference to the optimal operating point of the engine; calculating a first virtual SOC trend line for each section based on the SOC gain for each section calculated with reference to the optimal operating point of the engine; calculating an available torque of the motor for each section based on the first virtual SOC trend line and the expected input speed of the transmission for each section; calculating a limit of the available torque of the motor for each section based on the expected demand torque of the driver for each section and the available torque of the motor for each section; calculating an available SOC for each section based on the limit of the available torque of the motor for each section; setting an objective function to minimize accumulated work of the engine in the plurality of sections; setting constraint functions of a second virtual SOC trend line to minimize the accumulated work of the engine in the plurality of sections, an expected demand torque of the motor for each section, an expected demand torque of the engine, and accumulated driving work in the plurality of sections.

The method may further include determining design variables that satisfy the objective function and the constraint functions, wherein the design variables may include the second virtual SOC trend line, the expected demand torque of the motor for each section, and the accumulated work of the motor in the plurality of sections; calculating the expected demand torque of the engine for each section based on the expected demand torque of the driver for each section and the expected demand torque of the motor for each section; determining an expected driving mode of the hybrid electric vehicle for each section based on the expected demand torque of the driver for each section, the expected demand torque of the engine for each section, and the expected demand torque of the motor for each section;

determining a first threshold line and a second threshold line based on the second virtual SOC trend line, the average effective gradient for each section, and the average effective vehicle speed for each section; and operating the engine and the motor using the expected driving mode of the hybrid electric vehicle, the first threshold line, and the second threshold line.

The operating of the engine and the motor using the expected driving mode of the hybrid electric vehicle, the first threshold line, and the second threshold line may include: determining whether a current SOC of a battery is between the first threshold line and the second threshold line; when the current SOC of the battery is between the first threshold line and the second threshold line, calculating a demand torque of the motor at a current time based on a difference between an actual demand torque of the driver at the current time and the expected demand torque of the driver in a current section and the expected demand torque of the motor in the current section; calculating a demand torque of the engine at the current time based on the actual demand torque of the driver at the current time and a demand torque of the motor at the current time; and operating the engine and the motor based on the demand torque of the engine at the current time and the demand torque of the motor at the current time.

The operating of the engine and the motor using the expected driving mode of the hybrid electric vehicle, the first threshold line, and the second threshold line may further include: when the current SOC of the battery is less than the first threshold line, calculating a first delta SOC which is a difference between the current SOC of the battery and the first threshold line; calculating a first correction value based on the first delta SOC; and performing a charging-oriented control to charge the battery using the first correction value.

The performing of the charging-oriented control for charging the battery using the first correction value may include: calculating a corrected demand torque of the motor at the current time based on the demand torque of the motor at the current time and the first corrections value; calculating a corrected demand torque of the engine at the current time based on the actual demand torque of the driver at the current time and the corrected demand torque of the motor at the current time; and operating the engine and the motor based on the corrected demand torque of the engine at the current time and the corrected demand torque of the motor at the current time.

The operating of the operations of the engine and the motor using the expected driving mode of the hybrid electric vehicle, the first threshold value and the second threshold value may further include: when the current SOC is greater than the second threshold line, calculating a second delta SOC which is a difference between the current SOC of the battery and the second threshold line; calculating a second correction value based on the second delta SOC; and performing discharging-oriented control to discharge the battery using the second correction value.

The performing of the discharging-oriented control to discharge the battery using the second correction value may include: calculating a corrected demand torque of the motor at the current time based on the demand torque of the motor at the current time and the second correction value; calculating a corrected demand torque of the engine at the current time based on the actual demand torque of the driver at the current time and the corrected demand torque of the motor at the current time; and operating the engine and the motor based on the corrected demand torque of the engine at the current time and the corrected demand torque of the motor at the current time.

The average effective gradient for each section may be calculated by linearizing altitude by extracting extremums of the altitude. The average effective vehicle speed may be calculated based on information regarding a speed limit of the route and information regarding a traffic vehicle speed of the route toward the destination. The SOC gain for each section may include a discharging SOC gain for each section and a charging SOC gain for each section. When the demand torque of the motor for each section calculated with reference to the optimal operating point of the engine is a positive value, the discharging SOC gain for each section may be calculated based on the demand power of the motor for each section, discharging efficiency of the motor, the distance for each section, the average effective vehicle speed for each section, and a nominal power of the battery. When the demand torque of the motor for each section calculated with reference to the optimal operating point of the engine is a negative value, the charging SOC gain for each section may be calculated based on the demand power of the motor for each section, charging efficiency of the motor, the distance for each section, the average effective vehicle speed for each section, and the nominal power of the battery.

The available torque of the motor for each section may include a discharging available torque of the motor for each section and a charging available torque of the motor for each section. The discharging available torque of the motor for each section may be calculated based on the SOC of the battery at a start point for each section calculated with reference to the optimal operating point of the engine, a minimum limit of the SOC of the battery, the expected input speed of the transmission for each section, discharging efficiency of the motor, the distance for each section, the average effective vehicle speed for each section, and a nominal power of the battery. The charging available torque of the motor for each section may be calculated based on the SOC of the battery at the start point for each section calculated with reference to the optimal operating point of the engine, a maximum limit of the SOC of the battery, the expected input speed of the transmission, charging efficiency of the motor, the distance for each section, the average effective vehicle speed for each section, and the nominal power of the battery.

A limit of the available torque of the motor for each section may include a limit of the discharging available torque of the motor for each section and a limit of the charging available torque of the motor for each section the limit of the discharging available torque of the motor for each section may be calculated based on the discharging available torque of the motor for each section and the expected demand torque of the driver for each section, and the limit of the charging available torque of the motor for each section may be calculated based on the charging available torque of the motor for each section and the expected demand torque of the driver for each section.

The available SOC for each section may include a discharging available SOC for each section and a charging available SOC for each section. The discharging available SOC for each section may be calculated based on the limit of the discharging available torque of the motor for each section, and the charging available SOC for each section may be calculated based on the limit of the charging available torque of the motor for each section. The constraint function of the second virtual SOC trend line may be set based on the minimum limit of the SOC of the battery, the discharging available SOC for each section, the charging available SOC for each section, and the maximum limit of the SOC of the battery. Additionally, the constraint function of the expected demand torque of the motor for each section may be set based on a minimum torque capable of being output by the motor, the limit of the discharging available torque of the motor for each section, the limit of the charging available torque of the motor for each section, and a maximum torque capable of being output by the motor.

An apparatus for operating a hybrid electric vehicle according to an exemplary embodiment of the present invention may include: a navigation device configured to provide information regarding a road gradient, a speed limit, and a traffic speed of a road; an accelerator pedal position detector configured to detect a position of an accelerator pedal (e.g., an engagement degree); a brake pedal position detector configured to detect a position of a brake pedal (e.g., an engagement degree); a vehicle speed detector configured to detect a vehicle speed; a state of charge (SOC) detector configured to detect an SOC of a battery; a gear stage detector configured to detect a currently engaged gear stage; and a controller executed by a predetermined program to operate the hybrid vehicle based on signals of the navigation device, the accelerator pedal position detector, the brake pedal position detector, the vehicle speed detector, the SOC detector, and the gear stage detector. The various detectors may be embodied as sensors.

As described above, according to an exemplary embodiment of the present invention, driving energy of the hybrid electric vehicle in the entire route may be optimized. In addition, by operating the hybrid electric vehicle based on the expected driving mode when the current SOC of the battery is within the predetermined SOC, frequent mode switching of the hybrid electric vehicle may be prevented. Further, it may be possible to reduce the communication load between the navigation device and the controller and the calculation load of the controller.

BRIEF DESCRIPTION OF THE DRAWINGS

The above and other features of the present invention will now be described in detail with reference to exemplary embodiments thereof illustrated the accompanying drawings which are given herein below by way of illustration only, and thus are not limitative of the present invention, and wherein:

FIG. 3 is a graph illustrating a method for calculating an average effective road gradient for each section and an average effective vehicle speed for each section according to an exemplary embodiment of the present invention;

FIG. 4B is a graph illustrating accumulated work of a motor calculated with reference to an optimal operating point of an engine and accumulated work of the motor satisfying an objective function and constraint functions according to an exemplary embodiment of the present invention;

DESCRIPTION OF SYMBOLS

Figure 1:
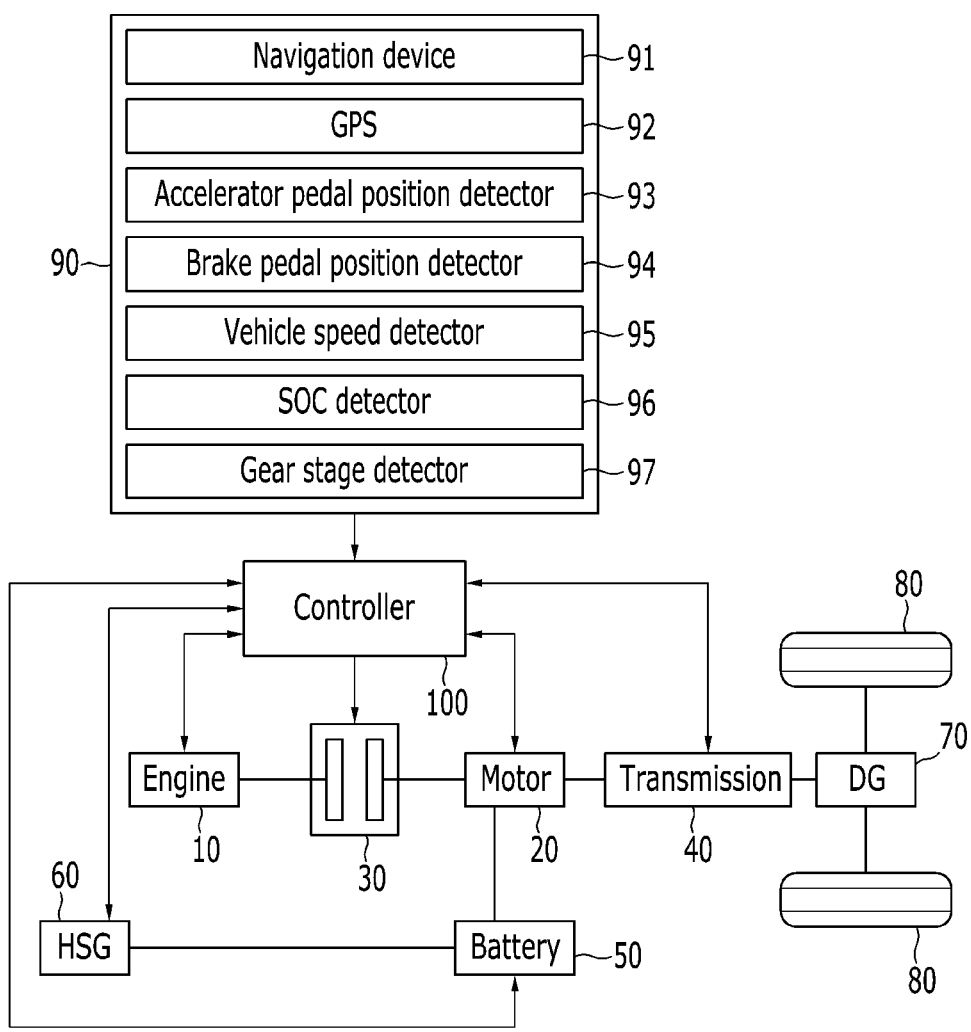
FIG. 1 is a block diagram of a hybrid electric vehicle according to an exemplary embodiment of the present invention.

10: engine
20: motor
30: engine clutch
40: transmission
50: battery
60: HSG
70: differential gear device
80: wheel
90: data detector
100: controller

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below. Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described more fully with reference to the accompanying drawings, in which exemplary embodiments of the invention are shown. As those skilled in the art would realize, the described exemplary embodiments may be modified in various different ways, all without departing from the spirit or scope of the present invention. The drawings and description are to be regarded as illustrative in nature and not restrictive. Like reference numerals designate like elements throughout the specification. Further, each configuration illustrated in the drawings is arbitrarily shown for better understanding and ease of description, but the present invention is not limited thereto.

FIG. 1 is a block diagram of a hybrid electric vehicle according to an exemplary embodiment of the present invention. As shown in FIG. 1, a hybrid electric vehicle according to an exemplary embodiment of the present invention may include an engine 10, a motor 20, an engine clutch 30 that selectively connects the engine 10 to the motor 20, a transmission 40, a battery 50, a hybrid starter & generator (HSG) 60, a differential gear device 70, a wheel 80, a data detector 90, and a controller 100. The controller 100 may be configured to operate the various parts of the vehicle.

The hybrid electric vehicle may be driven in an electric vehicle (EV) mode in which torque of the motor 20 is used; an engine mode in which only torque of the engine 10 is used; a hybrid electric vehicle (HEV) mode in which torque of the engine 10 is used as main torque and torque of the motor 20 is used as auxiliary torque; and a regenerative braking mode in which braking and inertial energy are recovered through electrical power generation of the motor 20 while braking the vehicle or during deceleration of the vehicle by inertia to be charged in the battery.

The engine 10 combusts a fuel to generate torque, and various engines such as a gasoline engine, a diesel engine, and a liquefied petroleum gas engine and electric motor (LPI engine) may be used as the engine 10. In connection with torque transmission of the hybrid electric vehicle, torque generated from the engine 10 and/or the motor 20 may be selectively transmitted to an input shaft of the transmission 40, and torque output from an output shaft of the transmission 40 may be transmitted to an axle via the differential gear device 70. The axle rotates the wheel 80 to allow the hybrid electric vehicle to travel by the torque generated from the engine 10 and/or the motor 20. The battery 50 may be configured to supply electricity to the motor 20 in the EV mode and the HEV mode, and may be charged with electricity recovered through the motor 20 in the regenerative braking mode.

The HSG 60 may be configured to start the engine 10 or generate electricity based on an output of the engine 10. The HSG 60 may refer to an integrated starter & generator (ISG). The data detector 90 (e.g., a sensor) may be configured to detect data used to operate the hybrid electric vehicle, and the data detected by the data detector 90 may be transmitted to the controller 100. The data detector 90 may include a navigation device 91, a global positioning system (GPS) 92, an accelerator pedal position detector 93, a brake pedal position detector 94, a vehicle speed detector 95, an SOC detector 96, and a gear stage detector 97.

The navigation device 91 may be configured to provide a driver with information regarding a route toward a destination. The navigation device 91 may include an input/output portion configured to receive or output information for guidance along the route, a current position detecting portion configured to detect information regarding a current position of the hybrid electric vehicle, a memory in which map data for calculating the route and data for guiding along the route may be stored, and a controller configured to search for the route and execute guidance along the route.

However, it is sufficient in an exemplary embodiment of the present invention for the navigation device 91 to provide information regarding a road gradient and a speed limit of the road included in three-dimensional (3D) map data and regarding a traffic vehicle speed of the road included in transport protocol expert group (TPEG) data to the controller 100. Therefore, it is to be understood that the navigation device 91 may include any device that may provide the information regarding the road gradient, the speed limit of the road, and the traffic vehicle speed of the road to the controller 100 in this specification and claims.

The GPS 92 may be configured to receive a signal transmitted from a GPS satellite and transmit a signal that corresponds thereto to the navigation device 91. The accelerator pedal position detector 93 may be configured to detect a position of an accelerator pedal (e.g., an engagement degree of the accelerator pedal or the amount of pressure exerted onto the pedal), and transmit a signal that corresponds thereto to the controller 100. When the accelerator pedal is completely engaged, the position of the accelerator pedal may be about 100%, and when the accelerator pedal is disengaged (e.g., no pressure is exerted onto the pedal), the position of the accelerator pedal may be about 0%. The brake pedal position detector 94 may be configured to detect a position of a brake pedal (e.g., an engagement degree of the brake pedal or the amount of pressure exerted onto the pedal), and transmit a signal that corresponds thereto to the controller 100. When the brake pedal is completely engaged, the position of the brake pedal may be about 100%, and when the brake pedal is disengaged (e.g., no pressure is exerted onto the pedal), the position of the brake pedal may be about 0%.

Further, the vehicle speed detector 95 (e.g., a sensor) may be configured to detect a vehicle speed and transmit a signal that corresponds thereto to the controller 100. Alternatively, the controller 100 may be configured to calculate the vehicle speed based on a GPS signal received by the GPS 92. The SOC detector 96 (e.g., a sensor) may be configured to detect a state of charge (SOC) of the battery 50 and transmit a signal that corresponds thereto to the controller 100. The gear stage detector 97 (e.g., a sensor) may be configured to detect a gear stage currently engaged, and transmit a signal that corresponds thereto to the controller 100. The gear stage may be detected when a ratio of an input speed and an output speed of the transmission 40 is detected. In addition, the gear stage may be detected from currently operated friction elements of the transmission 40.

The controller 100 may be implemented with one or more microprocessors executed by a predetermined program. The predetermined program may include a series of commands for performing each step included in a method for controlling a hybrid electric vehicle according to an exemplary embodiment of the present invention described below. Hereinafter, a method for controlling a hybrid electric vehicle according to an exemplary embodiment of the present invention will be described in detail with reference to FIG. 2A to FIG. 5D.

Figure 2A:
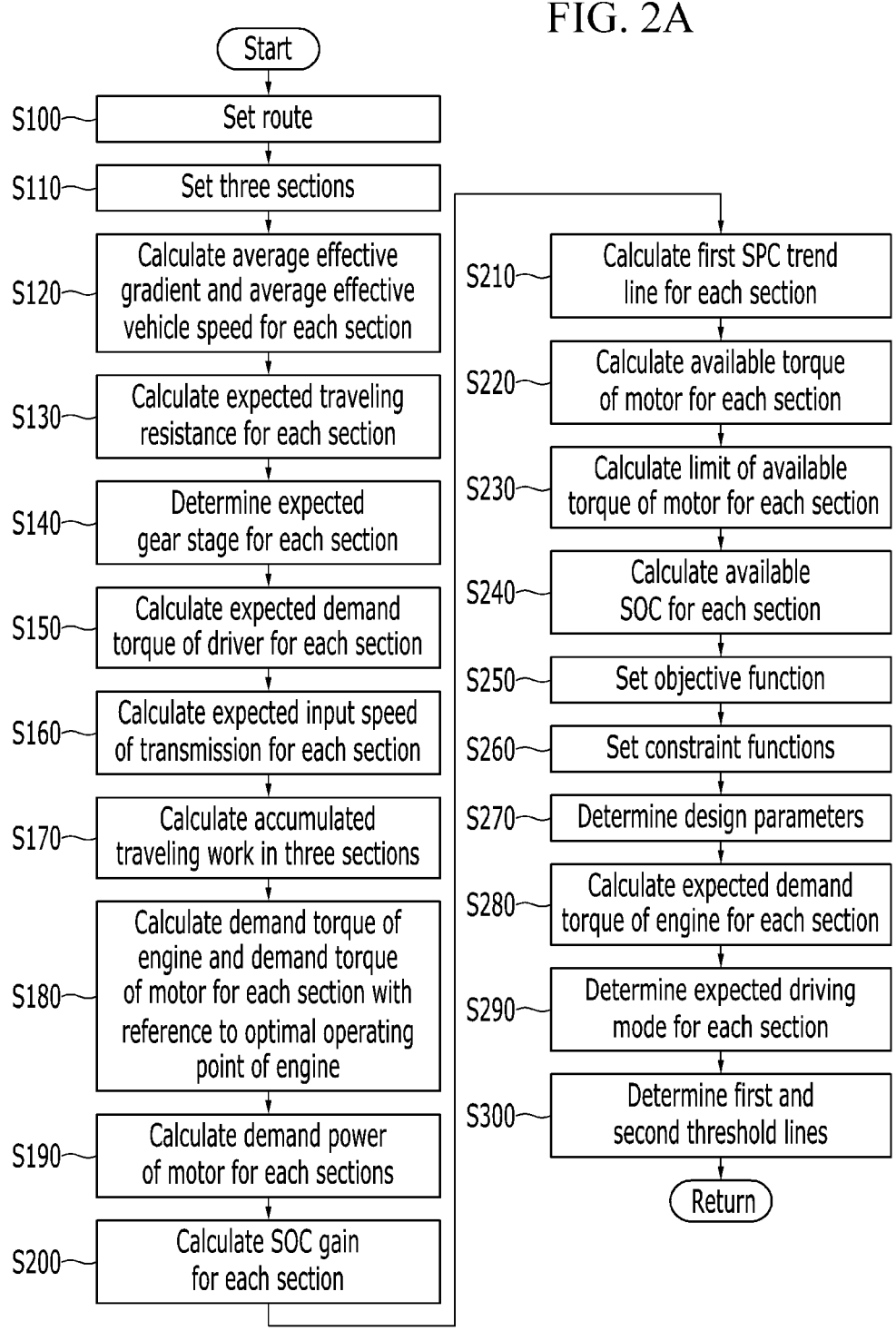
FIG. 2A and FIG. 2B are flowcharts of a method for controlling a hybrid electric vehicle according to an exemplary embodiment of the present invention.
Figure 2B:
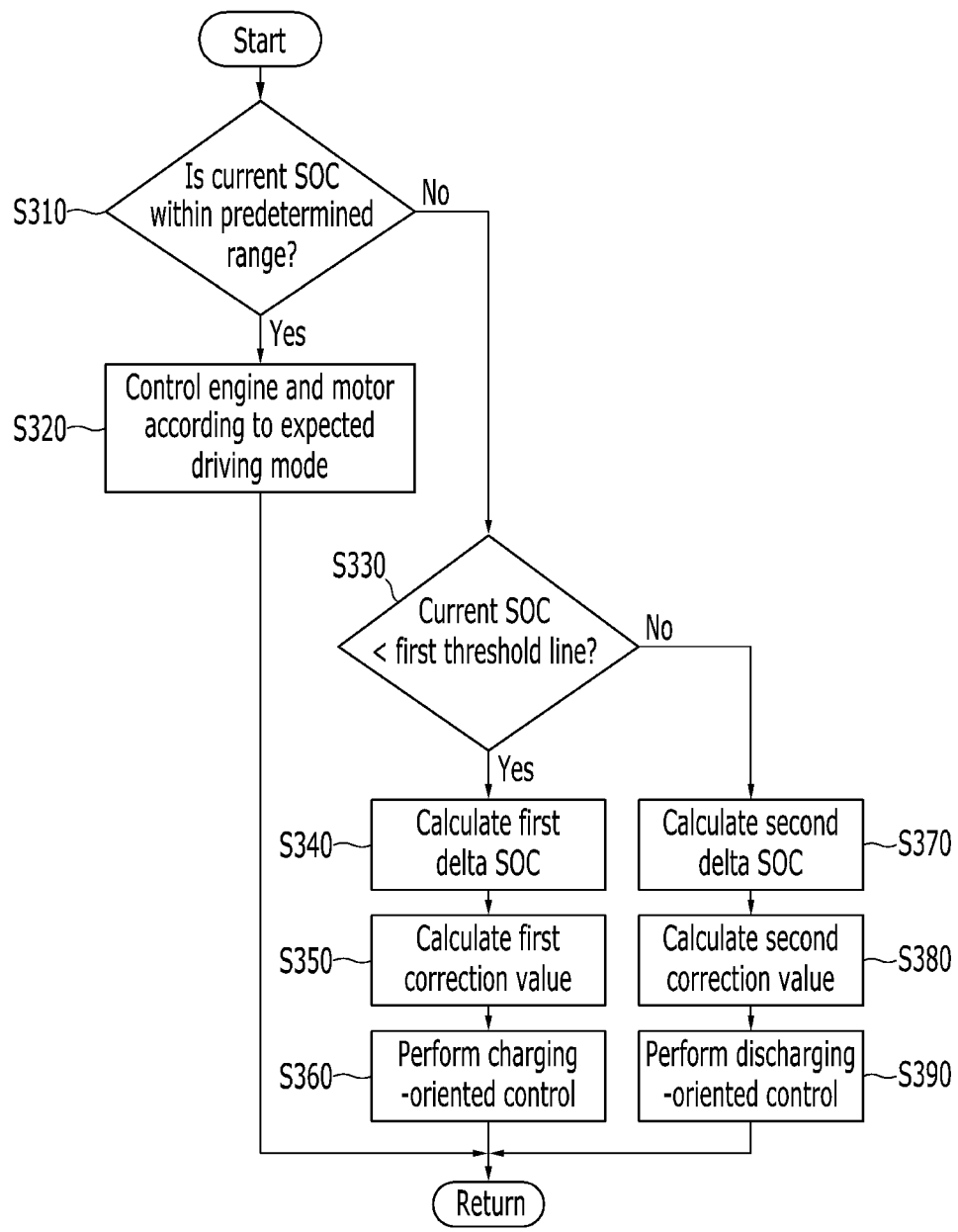
Figure 4A:
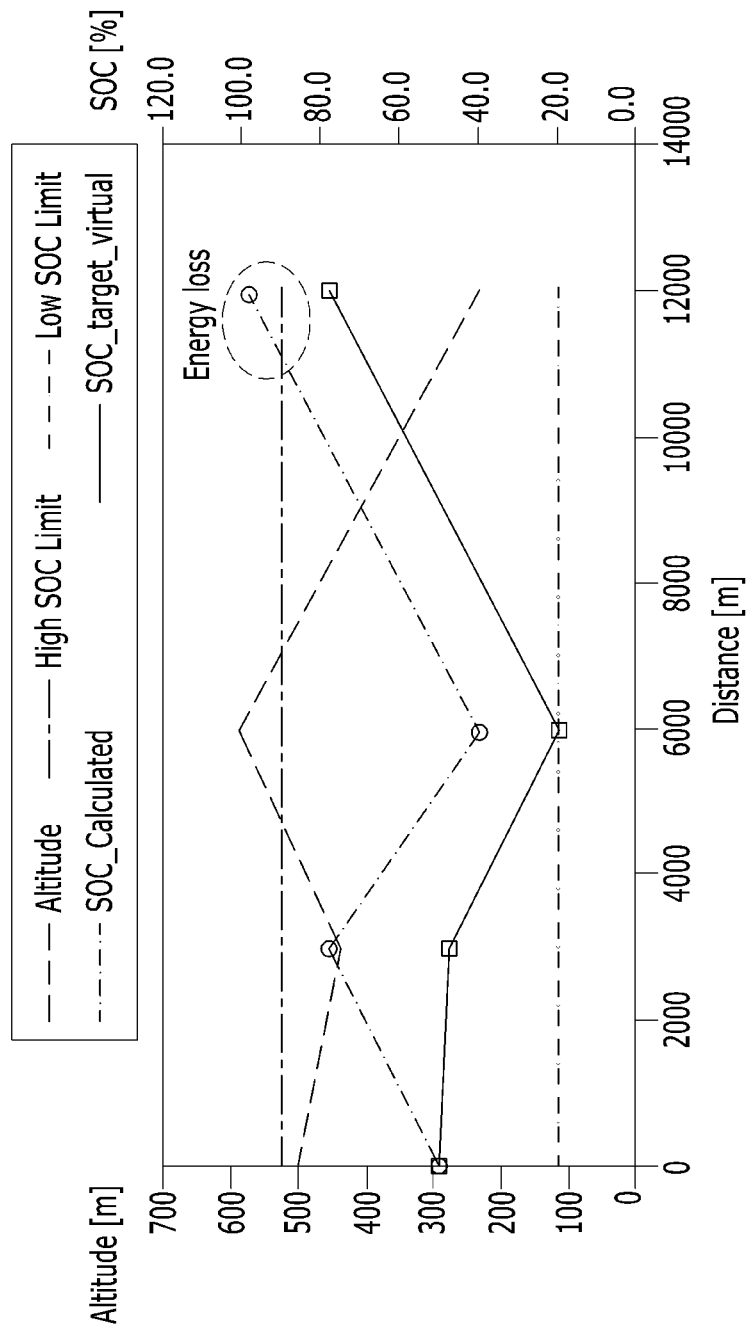
FIG. 4A is a graph illustrating a first virtual SOC trend line calculated with reference to an optimal operating point of an engine and a second SOC trend line satisfying an objective function and constraint functions according to an exemplary embodiment of the present invention.
Figure 4C:
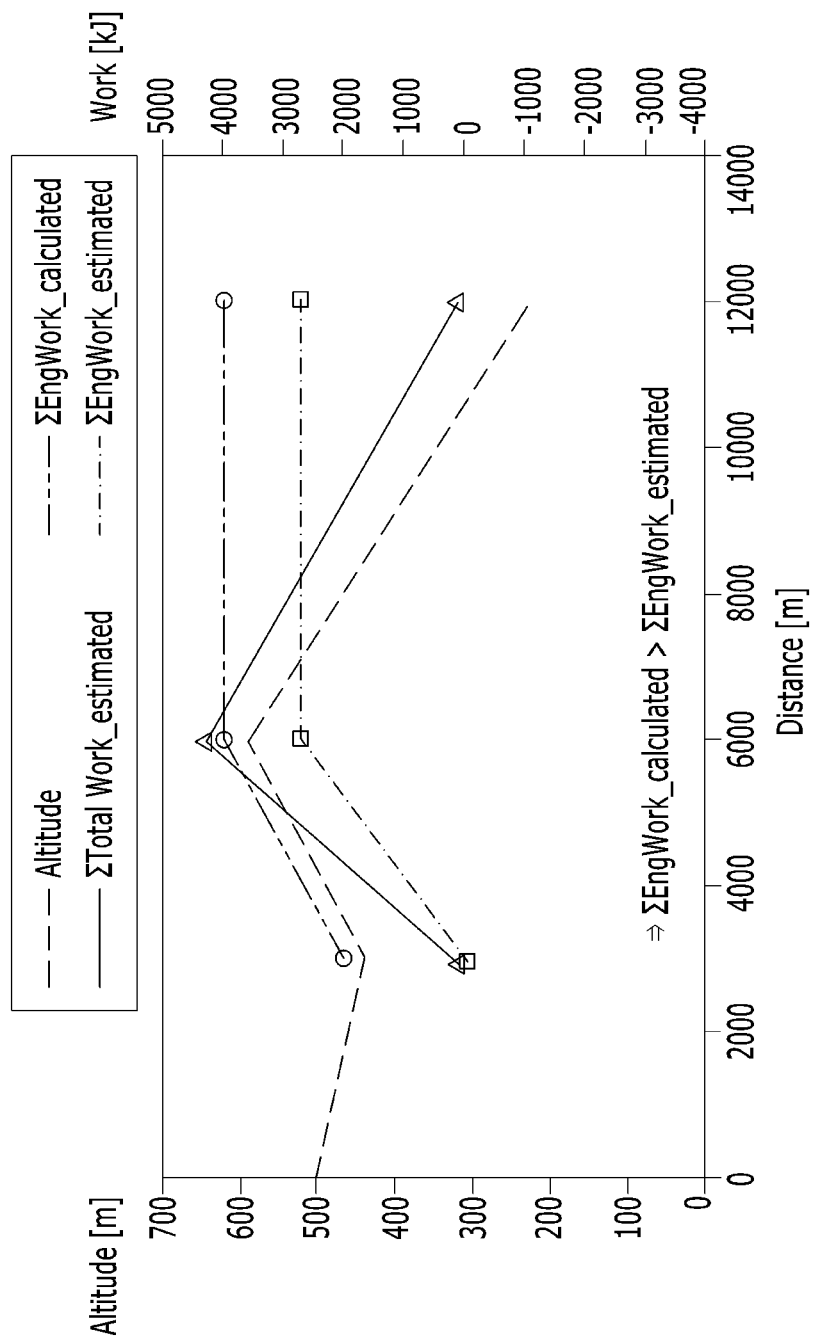
FIG. 4C is a graph illustrating accumulated work of an engine calculated based on an optimal operating point of an engine and accumulated work of the engine satisfying an objective function and constraint functions according to an exemplary embodiment of the present invention.
Figure 5A:
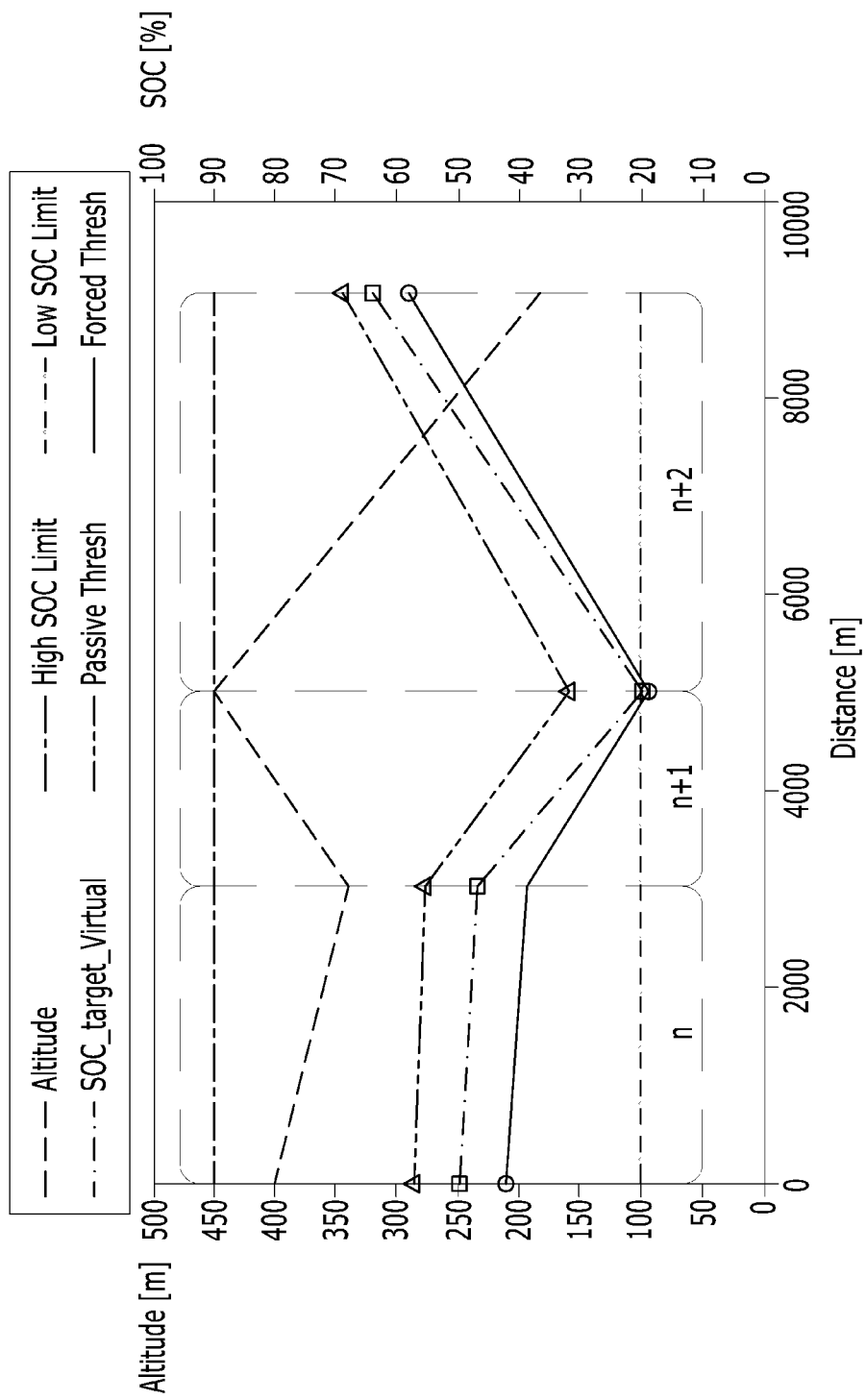
FIG. 5A is a graph illustrating an entire SOC area divided by a first threshold line and a second threshold line according to an exemplary embodiment of the present invention.
Figure 5B:
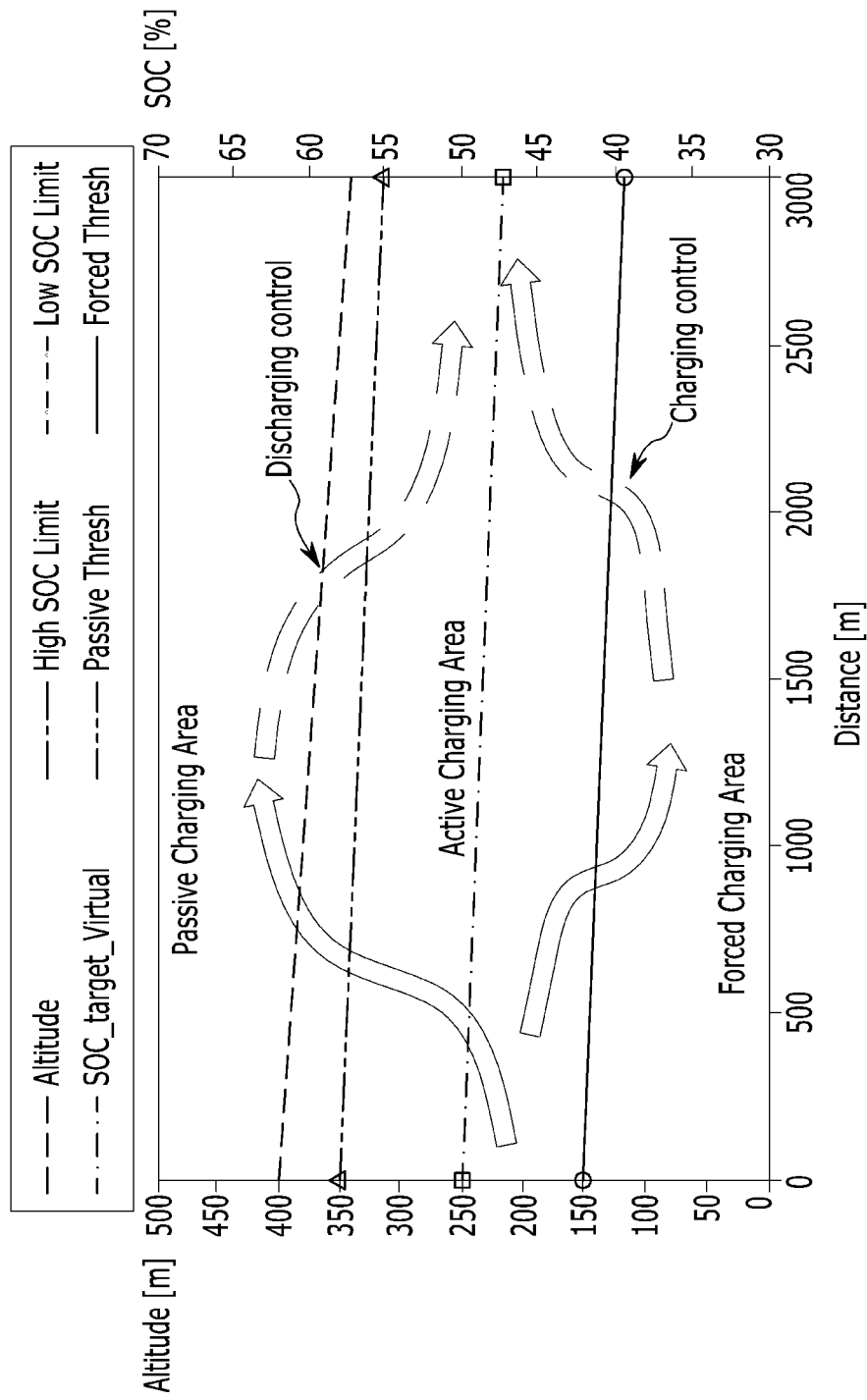
FIG. 5B is a graph illustrating a method for controlling a hybrid electric vehicle in an n-th section according to an exemplary embodiment of the present invention.
Figure 5C:
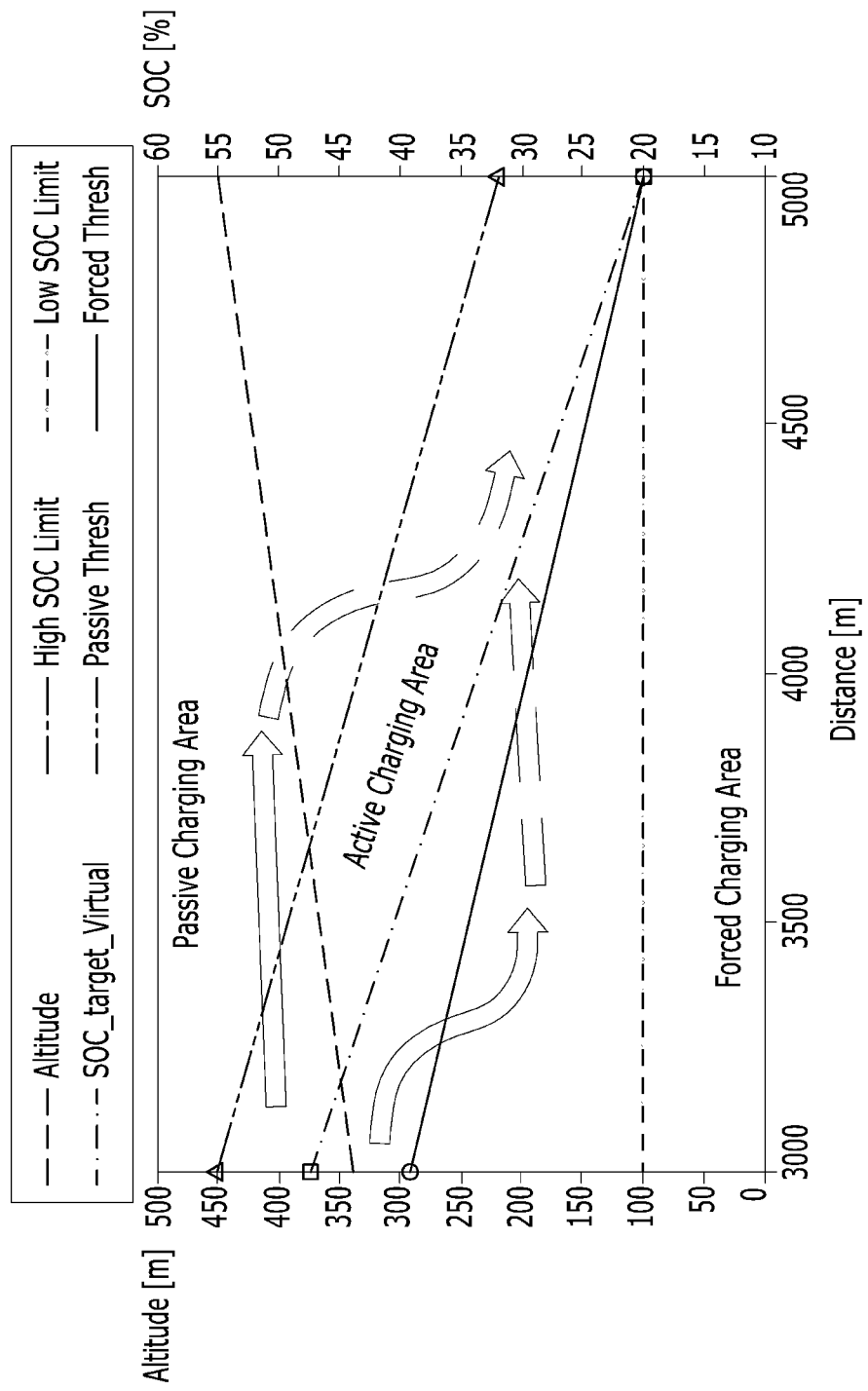
FIG. 5C is a graph illustrating a method for controlling a hybrid electric vehicle in an (n+1)-th section according to an exemplary embodiment of the present invention.
Figure 5D:
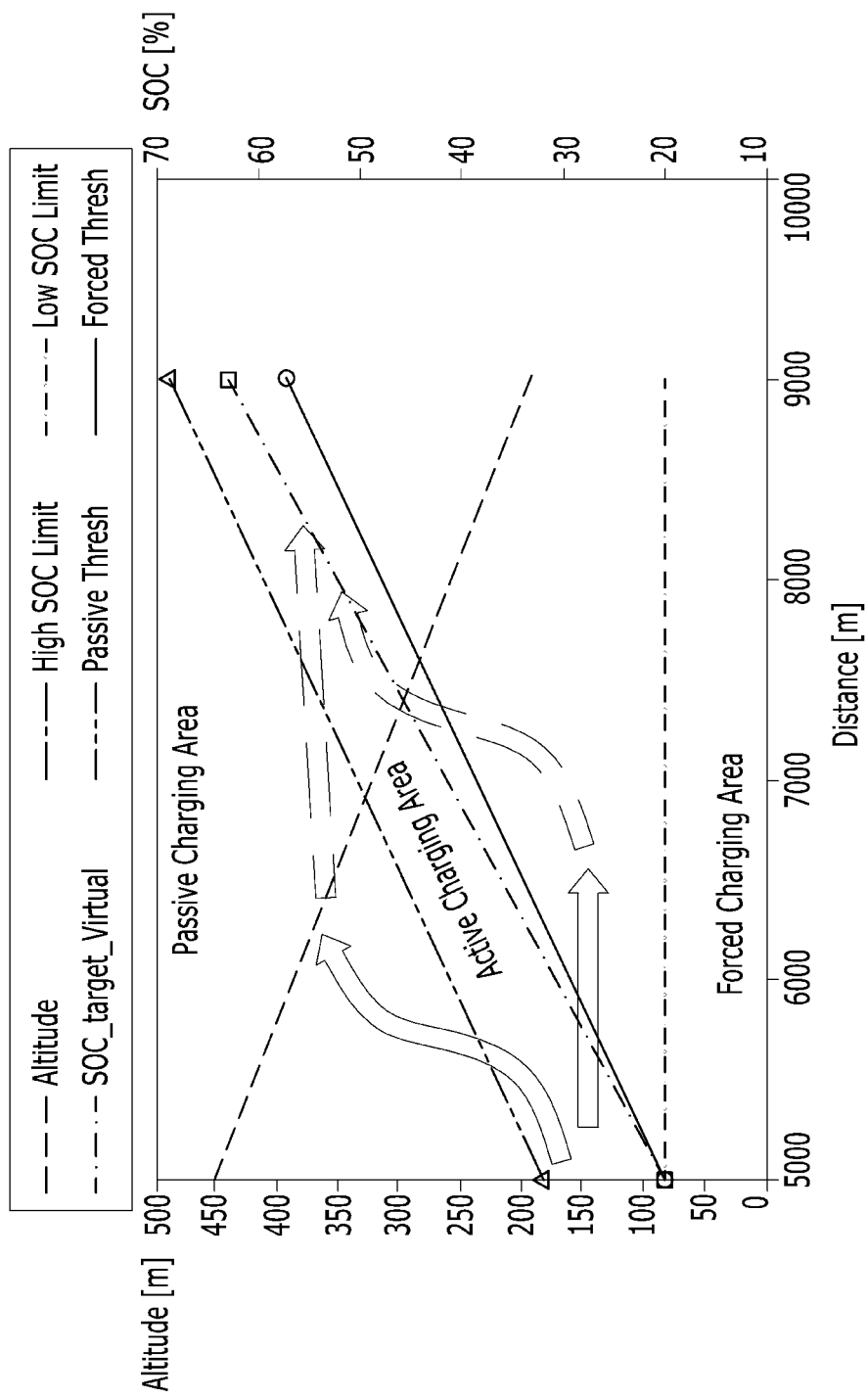
FIG. 5D is a graph illustrating a method for controlling a hybrid electric vehicle in an (n+2)-th section according to an exemplary embodiment of the present invention.

FIG. 2A and FIG. 2B are flowcharts of a method for controlling a hybrid electric vehicle according to an exemplary embodiment of the present invention, FIG. 3 is a graph illustrating a method for calculating an average effective gradient for each section and an average effective vehicle speed for each section according to an exemplary embodiment of the present invention, FIG. 4A is a graph illustrating a first virtual SOC trend line calculated with reference to an optimal operating point of an engine and a second SOC trend line satisfying an objective function and constraint functions according to an exemplary embodiment of the present invention, FIG. 4B is a graph illustrating accumulated work of a motor calculated with reference to an optimal operating point of an engine and accumulated work of the motor satisfying an objective function and constraint functions according to an exemplary embodiment of the present invention, FIG. 4C is a graph illustrating accumulated work of an engine calculated based on an optimal operating point of an engine and accumulated work of the engine satisfying an objective function and constraint functions according to an exemplary embodiment of the present invention, FIG. 5A is a graph illustrating an entire SOC area divided by a first threshold line and a second threshold line according to an exemplary embodiment of the present invention, FIG. 5B is a graph illustrating a method for controlling a hybrid electric vehicle in an n-th section according to an exemplary embodiment of the present invention, FIG. 5C is a graph illustrating a method for controlling a hybrid electric vehicle in an (n+1)-th section according to an exemplary embodiment of the present invention, and FIG. 5D is a graph illustrating a method for controlling a hybrid electric vehicle in an (n+2)-th section according to an exemplary embodiment of the present invention.

Referring to FIG. 2A, a method for controlling a hybrid electric vehicle according to an exemplary embodiment of the present invention may begin with setting a route from a current position of the hybrid electric vehicle toward a destination at step S100. When a user (e.g., a driver) selects the destination using the navigation device 91, the navigation device 91 may be configured to calculate the route from the current position of the hybrid electric vehicle toward the destination based on the 3D map data and the TPEG data. The navigation device 91 may then be configured to transmit information regarding an altitude of the route to the controller 100.

As shown in FIG. 3, the controller 100 may be configured to set at least three sections based on the information regarding the altitude of the route at step S110. In particular, the controller 100 may be configured to linearize the altitude by extracting extremums of the altitude, and may be configured to calculate a distance for each section (i.e., a distance between adjacent extremums). Additionally, the controller 100 may be configured to calculate an average effective gradient for each section based on the linearized altitude at step S120. The controller 100 may be configured to calculate an average effective vehicle speed for each section based on the information regarding a speed limit of the route and information regarding a traffic vehicle speed of the route.

FIG. 3 illustrates three sections (n, n+1 and n+2) in front of the hybrid electric vehicle, but the present invention is not limited thereto. The spirit of the present invention may be applied even when the number of sections is increased or reduced. When three sections in front of the hybrid electric vehicle are set by the controller 100, data transmitted to the controller 100 from the navigation device 91 may be minimized, thereby reducing a communication load between the navigation device 91 and the controller 100 and a calculation load of the controller 100.

Further, the controller 100 may be configured to calculate an expected driving resistance for each section based on the distance for each section, the average effective gradient for each section, and the average effective vehicle speed for each section at step S130. The controller 100 may be configured to calculate an expected driving force $F_{D\_est}$ of the hybrid electric vehicle based on the expected driving resistance $R_{Roadload}$ using the following Equation 1.

$$(R_{Roadload})_k \Big|_{k=n}^{n+2} = (R_a)_k + (R_g)_k + (R_r)_k + (R_f)_k = (F_{D\_est})_k \quad \text{Equation 1}$$

wherein, $R_a$ is an air resistance, $R_g$ is a gradient resistance, $R_r$ is a rolling resistance, and $R_f$ is an acceleration resistance.

In particular, the controller 100 may be configured to calculate the expected driving force $F_{D\_est}$ using the following Equation 2.

$$(F_{D\_est})_k \Big|_{k=n}^{n+2} = \left(\frac{1}{2} \cdot \rho \cdot v_{res}^2 \cdot C_D \cdot A\right)_k + (m_t \cdot g \cdot \sin\alpha)_k + (m_t \cdot g \cdot (f_0 + f_1 \cdot v) \cdot \cos\alpha)_k + ((m_t + \Delta m) \cdot a)_k \quad [N] \quad \text{Equation 2}$$

wherein, $\rho$ is air density, $v_{res}$ is a sum of a speed of wind and the average effective vehicle speed for each section, $C_D$ is an air resistance coefficient, A is a front area of the hybrid electric vehicle, $m_t$ is a total weight of the hybrid electric vehicle, g is gravitational acceleration, a is the average effective gradient for each section, $f_0$ and $f_1$ are coefficients, $\Delta m$ is equivalent mass of rotation, and a is an acceleration of the hybrid electric vehicle.

Unlike the method of calculating the air resistance, the gradient resistance, the rolling resistance, and the acceleration resistance, the controller 100 may be configured to calculate the expected driving force $F_{D\_est}$ using the following Equation 3.

$$(F_{D\_est})_k \Big|_{k=n}^{n+2} = (C_0 + C_1 \cdot v + C_2 \cdot v^2)_k \quad [N] \quad \text{Equation 3}$$

wherein, $C_0$, $C_1$ and $C_2$ are coefficients and may be previously calculated.

The controller 100 may further be configured to determine an expected gear stage for each section based on the average effective gradient for each section and the average effective vehicle speed for each section at step S140. The controller 100 may then be configured to calculate an expected demand torque $T_{driver\_est}$ of a driver for each section based on the expected driving force $F_{D\_est}$ for each section and the expected gear stage for each section using the following Equation 4 at step S150.

$$(T_{driver\_est})_k \Big|_{k=n}^{n+2} = \left( \frac{F_{D\_est} \cdot R_{tire}}{R_{FGR} \cdot R_{Gear\_est} \cdot \eta_{tm}} \right)_k \; [Nm] \quad \text{Equation 4}$$

wherein, $F_{D\_est}$ is the expected driving force for each section, $R_{tire}$ is a radius of a tire, $R_{FGR}$ is a gear ratio of a final reduction gear, $R_{Gear\_est}$ is a gear ratio in the expected gear stage for each section, and $\eta_{tm}$ is transmission efficiency of the transmission 40.

The controller 100 may be configured to calculate an expected input speed $\omega_{driver\_est}$ of the transmission 40 for each section based on the average effective vehicle speed for each section and the expected gear stage for each section using the following Equation 5 at step S160.

$$(\omega_{driver\_est})_k \Big|_{k=n}^{n+2} = \left( \frac{v \cdot R_{FGR} \cdot R_{Gear\_est}}{R_{tire}} \right)_k \; [rad/s] \quad \text{Equation 5}$$

wherein, $v$ is the average effective vehicle speed for each section, $R_{FGR}$ is the gear ratio of the final reduction gear, $R_{Gear\_est}$ the gear ratio in the expected gear stage for each section, and $R_{tire}$ is the radius of the tire.

The expected demand torque $T_{driver\_est}$ of the driver for each section may be determined by a sum of an expected torque $T_{eng\_est}$ of the engine 10 for each section and an expected torque $T_{mot\_est}$ of the motor 20 for each section as shown in the following Equation 6.

$$(T_{driver\_est})_k \Big|_{k=n}^{n+2} = (T_{eng\_est})_k + (T_{mot\_est})_k \; [Nm] \quad \text{Equation 6}$$

The controller 100 may further be configured to calculate accumulated driving work $$\sum_{k=n}^{n+2} (W_{Roadload\_est})_k$$

in the three sections based on the expected demand torque $T_{driver\_est}$ of the driver for each section and the expected input speed $\omega_{driver\_est}$ of the transmission 40 for each section using the following Equation 7 at step S170.

$$\sum_{k=n}^{n+2} (W_{Roadload\_est})_k = \sum_{k=n}^{n+2} \left( \frac{T_{driver\_est} \cdot \omega_{driver\_est}}{1000} \right)_k \cdot \left( \frac{D}{v} \right)_k \; [kJ] \quad \text{Equation 7}$$

wherein, $T_{driver\_est}$ is the expected demand torque of the driver for each section, $\omega_{driver\_est}$ is the expected input speed of the transmission 40 for each section, D is the distance for each section, and v is the average effective vehicle speed for each section.

The accumulated driving work $$\sum_{k=n}^{n+2} (W_{Roadload\_est})_k$$

in the three sections may be determined by a sum of accumulated work $$\sum_{k=n}^{n+2} (W_{eng\_est})_k$$

of the engine 10 in the three sections and accumulated work $$\sum_{k=n}^{n+2} (W_{mot\_est})_k$$

of the motor 20 in the three sections as shown in the following Equation 8.

$$\sum_{k=n}^{n+2} (W_{Roadload\_est})_k = \sum_{k=n}^{n+2} (W_{eng\_est})_k + \sum_{k=n}^{n+2} (W_{mot\_est})_k \; [kJ] \quad \text{Equation 8}$$

The accumulated work $$\sum_{k=n}^{n+2} (W_{eng\_est})_k$$

of the engine 10 in the three sections may be expressed by the following Equation 9.

$$\sum_{k=n}^{n+2} (W_{eng\_est})_k = \sum_{k=n}^{n+2} \left( \frac{T_{eng\_est} \cdot \omega_{driver\_est}}{1000} \right)_k \cdot \left( \frac{D}{v} \right)_k \; [kJ] \quad \text{Equation 9}$$

wherein, $T_{eng\_est}$ is the expected torque of the engine 10 for each section, $\omega_{driver\_est}$ is the expected input speed of the transmission 40 for each section, D is the distance for each section, and v is the average effective vehicle speed for each section.

The accumulated work $$\sum_{k=n}^{n+2} (W_{mot\_est})_k$$

of the motor 20 in the three sections may be expressed by the following Equation 10.

$$\sum_{k=n}^{n+2} (W_{mot\_est})_k = \sum_{k=n}^{n+2} \left( \frac{T_{mot\_est} \cdot \omega_{driver\_est}}{1000} \right)_k \cdot \left( \frac{D}{v} \right)_k [kJ] \quad \text{Equation 10}$$

wherein, $T_{mot\_est}$ is the expected torque of the motor 20 for each section, $\omega_{driver\_est}$ is the expected input speed of the transmission 40 for each section, D is the distance for each section, and v is the average effective vehicle speed for each section.

Furthermore, controller 100 may be configured to calculate a demand torque $T_{eng\_calculated}$ of the engine 10 and a demand torque $T_{mot\_calculated}$ of the motor 20 with reference to an optimal operating point of the engine 10 at step S180. The operating point may be predetermined based on a demand torque of a driver by a person of ordinary skill in the art. In other words, the controller 100 may be configured to calculate the demand torque $T_{eng\_calculated}$ of the engine 10 for each section and the demand torque $T_{mot\_calculated}$ of the motor 20 for each section from the expected demand torque $T_{driver\_est}$ of the driver with reference to the optimal operating point of the engine 10.

The controller 100 may be configured to calculate a demand power $P_{mot\_calculated}$ of the motor 20 for each section based on the demand torque $T_{mot\_calculated}$ of the motor 20 for each section calculated with reference to the optimal operating point of the engine 10 and the expected input speed $\omega_{driver\_est}$ of the transmission 40 for each section using the following Equation 11 at step S190.

$$(P_{mot\_calculated})_k^{n+2} = \left( \frac{T_{mot\_calculated} \cdot \omega_{driver\_est}}{1000} \right)_k [kW] \quad \text{Equation 11}$$

wherein, $T_{mot\_calculated}$ is the demand torque of the motor 20 calculated with reference to the optimal operating point of the engine 10, and $\omega_{driver\_est}$ is the expected input speed of the transmission 40 for each section.

Additionally, the controller 100 may be configured to calculate an SOC gain $SOC_{gain\_calculated}$ for each section based on the demand power $P_{mot\_calculated}$ of the motor 20 for each section calculated with reference to the optimal operating point of the engine 10 at step S200. The SOC gain $SOC_{gain\_calculated}$ for each section may include a discharging SOC gain $SOC_{gain\_calculated\_discharge}$ for each section and a charging SOC gain $SOC_{gain\_calculated\_charge}$ for each section. When the demand torque $T_{mot\_calculated}$ of the motor 20 for each section calculated with reference to the optimal operating point of the engine 10 is a positive value (e.g., greater than zero), the controller 100 may be configured to calculate the discharging SOC gain $SOC_{gain\_calculated\_discharge}$ for each section using the following Equation 12.

$$(SOC_{gain\_calculated\_discharge})_k^{n+2} =$$
$$-\left( P_{mot\_calculated} \cdot \frac{\eta_{discharge} \cdot D}{3600 \cdot v \cdot P_{battery\_nominal}} \right)_k \cdot 100[\%] \quad \text{Equation 12}$$

wherein, $P_{mot\_calculated}$ is the demand power of the motor 20 for each section, $\eta_{discharge}$ is discharging efficiency of the motor 20, D is the distance for each section, v is the average effective vehicle speed for each section, and $P_{battery\_nominal}$ is a nominal power of the battery 50.

When the demand torque $T_{mot\_calculated}$ of the motor 20 for each section calculated with reference to the optimal operating point of the engine 10 is a negative value (e.g., less than zero), the controller 100 may be configured to calculate the charging SOC gain $SOC_{gain\_calculated\_charge}$ for each section using the following Equation 13.

$$(SOC_{gain\_calculated\_charge})_k^{n+2} =$$
$$-\left( P_{mot\_calculated} \cdot \frac{\eta_{charge} \cdot D}{3600 \cdot v \cdot P_{battery\_nominal}} \right)_k \cdot 100[\%] \quad \text{Equation 13}$$

wherein, $P_{mot\_calculated}$ is the demand power of the motor 20 for each section, $\eta_{charge}$ is charging efficiency of the motor 20, D is the distance for each section, v is the average vehicle speed for each section, and $P_{battery\_nominal}$ is the nominal power of the battery 50.

The controller 100 may be configured to calculate a first virtual SOC trend line $SOC_{calculated}$ for each section based on the SOC gain $SOC_{gain\_calculated}$ calculated with reference to the optimal operating point of the engine 10 at step S210. In particular, the controller 100 may be configured to calculate an SOC at an end point for each section based on the SOC gain $SOC_{gain\_calculated}$ for each section using the following Equation 14.

$$(SOC_{calculated})_{k\_end}^{n+2} = SOC_{k\_start} + (SOC_{gain\_calculated})_k, \quad \text{Equation 14}$$
$$\text{where } SOC_{n\_start} = SOC_{current}$$

wherein, $SOC_{k\_start}$ is an SOC at a start point for each section calculated with reference to the optimal operating point of the engine 10, $SOC_{gain\_calculated}$ is the SOC gain for each section with reference to the optimal operating point of the engine 10, and $SOC_{current}$ is an SOC at a current time.

In other words, as shown in FIG. 4A, the controller 100 may be configured to calculate the first virtual SOC trend line $SOC_{calculated}$ based on the SOC $SOC_{current}$ at the current time and the SOC at the end point for each section. The controller 100 may also be configured to calculate an available torque $T_{mot\_available}$ of the motor 20 for each section based on the first virtual SOC trend line calculated with reference to the optimal operating point of the engine 10 and the expected input speed $\omega_{driver\_est}$ of the transmission 40 for each section at step S220. The available torque $T_{mot\_available}$ of the motor 20 for each section may include a discharging available torque $T_{mot\_available\_discharge}$ of the motor for each section and a charging available torque $T_{mot\_available\_charge}$ of the motor for each section. The controller 100 may be configured to calculate the discharging available torque $T_{mot\_available\_discharge}$ of the motor 20 for each section using the following Equation 15.

$$(T_{mot\_available\_discharge})_k^{n+2} = (SOC_{k\_start} - SOC_{min\_limit}) \Big/ \quad \text{Equation 15}$$

-continued $$\left(\frac{\omega_{driver\_est} \cdot \eta_{discharge} \cdot D}{1000 \cdot 3600 \cdot v \cdot P_{battery\_nominal}}\right)_k \cdot 100 [Nm]$$

wherein, $SOC_{k\_start}$ is the SOC of the battery 50 at the start point for each section calculated with reference to the optimal operating point of the engine 10, $SOC_{min\_limit}$ is a minimum limit of the SOC of the battery 50, $\omega_{driver\_est}$ is the expected input speed of the transmission 40 for each section, $\eta_{discharge}$ is the discharging efficiency of the motor 20, D is the distance for each section, v is the average effective vehicle speed for each section, and $P_{battery\_nominal}$ is the nominal power of the battery 50.

The minimum limit of the SOC of the battery 50 may be set by a person of ordinary skill in the art based on the performance of the battery 50. The controller 100 may be configured to calculate the charging available torque $T_{mot\_available\_charge}$ of the motor 20 for each section using the following Equation 16.

$$(T_{mot\_available\_charge})_k^{n+2}_{k=n} = (SOC_{k\_start} - SOC_{max\_limit}) / \left(\frac{\omega_{driver\_est} \cdot \eta_{discharge} \cdot D}{1000 \cdot 3600 \cdot v \cdot P_{battery\_nominal}}\right)_k \cdot 100 [Nm]$$

Equation 16 wherein, $SOC_{k\_start}$ is the SOC of the battery 50 at the start point for each section calculated with reference to the optimal operating point of the engine 10, $SOC_{max\_limit}$ is a maximum limit of the SOC of the battery 50, $\omega_{driver\_est}$ is the expected input speed of the transmission 40 for each section, $\eta_{charge}$ is the charging efficiency of the motor 20, D is the distance for each section, v is the average effective vehicle speed for each section, and $P_{battery\_nominal}$ is the nominal power of the battery 50.

The maximum limit of the SOC of the battery 50 may be set by a person of ordinary skill in the art based on the performance of the battery 50. The controller 100 may be configured to calculate a limit $T_{mot\_limited}$ of the available torque of the motor 20 for each section based on the expected demand torque $T_{driver\_est}$ of the driver for each section and the available torque $T_{mot\_limited}$ of the motor 20 at step S230. The limit $T_{mot\_limited}$ of the available torque of the motor 20 for each section may include a limit $T_{mot\_discharge\_limited}$ of the discharging available torque of the motor 20 for each section and a limit $T_{mot\_charge\_limited}$ of the charging available torque of the motor for each section. Particularly, when the discharging available torque $T_{mot\_available\_discharge}$ of the motor 20 for each section is equal to or greater than the expected demand torque $T_{driver\_est}$ of the driver for each section, the limit $T_{mot\_discharge\_limited}$ of the discharging available torque of the motor 20 for each section may be the expected demand torque $T_{driver\_est}$ of the driver for each section.

Additionally, when the discharging available torque $T_{mot\_available\_discharge}$ of the motor 20 for each section is less than the expected demand torque $T_{driver\_est}$ of the driver for each section, the limit $T_{mot\_discharge\_limited}$ of the discharging available torque of the motor 20 for each section may be the discharging available torque $T_{mot\_available\_discharge}$ of the motor 20 for each section. When the charging available torque $T_{mot\_available\_charge}$ of the motor 20 for each section is equal to or greater than the expected demand torque $T_{driver\_est}$ of the driver for each section, the limit $T_{mot\_charge\_limited}$ of the charging available torque of the motor 20 for each section may be the expected demand torque $T_{driver\_est}$ of the driver for each section. When the charging available torque $T_{mot\_available\_charge}$ of the motor 20 for each section is less than the expected demand torque $T_{driver\_est}$ of the driver for each section, the charging available torque $T_{mot\_charge\_limited}$ of the motor 20 for each section may be the charging available torque $T_{mot\_available\_charge}$ of the motor 20 for each section.

The controller 100 may further be configured to calculate an available SOC $SOC_{gain\_available}$ for each section based on the limit $T_{mot\_limited}$ of the available torque of the motor 20 for each section at step S240. The available SOC $SOC_{gain\_available}$ for each section may include a discharging available SOC $SOC_{gain\_available\_discharge}$ for each section and charging available SOC $SOC_{gain\_available\_charge}$ for each section. In particular, the controller 100 may be configured to calculate the discharging available SOC $SOC_{gain\_available\_discharge}$ by converting the limit $T_{mot\_discharge\_limited}$ of the discharging available torque of the motor 20 for each section, and may be configured to calculate the charging available SOC $SOC_{gain\_available\_charge}$ for each section by converting the limit $T_{mot\_charge\_limited}$ of the charging available torque of the motor 20 for each section.

To maximize fuel efficiency of the hybrid electric vehicle (i.e., to optimize driving energy of the hybrid electric vehicle in the three sections), accumulated work $$\sum_{k=n}^{n+2} (W_{eng\_est})_k$$

of the engine 10 in the three sections may be minimized. In other words, the controller 100 may be configured to set an objective function as the following Equation 17 at step S250.

$$f(x) = \min \sum_{k=n}^{n+2} (W_{eng\_est})_k$$

Equation 17

In other words, the accumulated work of the engine 10 in the three sections may be minimized (e.g. the object function) to optimize the driving energy of the hybrid electric vehicle in the three sections. To calculate the objective function, the controller 100 may be configured to set constraint functions of a second virtual SOC trend line $SOC_{target\_virtual}$, an expected demand torque $T_{mot\_desired\_est}$ of the motor 20 for each section, an expected demand torque $T_{eng\_desired\_est}$ of the engine 10, and accumulated driving work $$\sum_{k=n}^{n+2} (W_{Roadload\_est})_k$$

in the three sections as following Equations 18 to 21 to minimize the accumulated work of the engine 10 in the three sections at step S260. The controller 100 may be configured to set the second virtual SOC trend line $SOC_{target\_virtual}$ to minimize the accumulated work of the engine 10 in the three sections as the following Equation 18 based on the available SOC $SOC_{gain\_available}$ for each section.

$$SOC_{min\_limit} \leq (SOC_{gain\_available\_discharge})_k \leq \qquad \text{Equation 18}$$

$$(SOC_{target\_virtual})_k \overset{n+2}{\underset{k=n}{}} \leq (SOC_{gain\_available\_charge})_k \leq SOC_{max\_limit}$$

wherein, $SOC_{min\_limit}$ is the minimum limit of the SOC of the battery 50, $SOC_{gain\_available\_discharge}$ is the discharging available SOC for each section, $SOC_{gain\_available\_charge}$ is the charging available SOC for each section, and $SOC_{max\_limit}$ is the maximum limit of the SOC of the battery 50.

Additionally, controller 100 may be configured to set the expected demand torque $T_{mot\_desired\_est}$ of the motor 20 for each section as the following Equation 19 based on the available torque $T_{mot\_available}$ of the motor 20 for each section.

$$T_{mot\_charge\_min\_limit} \leq (T_{mot\_charge\_limited})_k \leq (T_{mot\_desired\_est})_k \overset{n+2}{\underset{kn}{}} \leq \qquad \text{Equation 19}$$

$$(T_{mot\_discharge\_limited})_k \leq T_{mot\_discharged\_max\_limit}$$

wherein, $T_{mot\_charge\_min\_limit}$ is a minimum torque capable of being output by the motor 20, $T_{mot\_charge\_limited}$ is the limit of the charging available torque of the motor 20 for each section, $T_{mot\_discharge\_limited}$ is the limit of the discharging available torque of the motor 20 for each section, and $T_{mot\_discharge\_max\_limited}$ is a maximum torque that may be output by the motor 20.

The controller 100 may be configured to set the expected demand torque $T_{eng\_desired\_est}$ of the engine 10 as the following Equation 20.

$$T_{eng\_min\_limit} \leq (T_{eng\_desired\_est})_k \overset{n+2}{\underset{k=n}{}} \leq T_{eng\_max\_limit} \qquad \text{Equation 20}$$

wherein, $T_{eng\_min\_limit}$ is a minimum torque capable of being output by the engine 10, and $T_{eng\_max\_limit}$ is a maximum torque capable of being output by the engine 10.

The controller 100 may further be configured to set the accumulated driving work $$\sum_{k=n}^{n+2}(W_{Roadload\_est})_k$$

in the three sections as the following Equation 21.

$$\sum_{k=n}^{n+2}(W_{Roadload\_est})_k = \sum_{k=n}^{n+2}(W_{eng\_est})_k + \sum_{k=n}^{n+2}(W_{mot\_est})_k \qquad \text{Equation 21}$$

wherein, $$\sum_{k=n}^{n+2}(W_{eng\_est})_k$$

is accumulated work of the engine 10 in the three sections, and $$\sum_{k=n}^{n+2}(W_{mot\_est})_k$$

is accumulated work of the motor 20 in the three sections.

The controller 100 may be configured to determine design variables that satisfy the objecting function and the constraint functions at step S270. The design variables may include the second virtual SOC trend line $SOC_{target\_virtual}$, the expected demand torque $T_{mot\_desired\_est}$ of the motor 20 for each section, and the accumulated work $$\sum_{k=n}^{n+2}(W_{mot\_est})_k$$

of the motor 20 in the three sections. The design variables may have relationships shown in Equations 22 to 24.

$$(SOC_{target\_virtual})_{k\_end} \overset{n+2}{\underset{k=n}{}} = SOC_{k\_start} + (SOC_{gain\_optimized\_est})_k, \qquad \text{Equation 22}$$

where $SOC_{n\_start} = SOC_{current}$ wherein, $SOC_{gain\_optimized\_est}$ is a virtual SOC gain for each section.

$$(T_{mot\_desired\_est})_k \overset{n+2}{\underset{k=n}{}} = -(SOC_{gain\_optimized\_est})_k \Big/ \qquad \text{Equation 23}$$

$$\left(\frac{\omega_{driver\_est} \cdot \eta \cdot D}{1000 \cdot 3600 \cdot v \cdot P_{battery\_nominal}}\right)_k \cdot 100$$

wherein, $\omega_{driver\_est}$ is the expected input speed of the transmission 40 for each section, $\eta$ is the discharging efficiency $\eta_{discharge}$ of the motor 20 or the charging efficiency $\eta_{charge}$ of the motor 20, D is the distance for each section, v is the average effective vehicle speed for each section, and $P_{battery\_nominal}$ is the nominal power of the battery 50.

$$\sum_{k=n}^{n+2}(W_{mot\_est})_k = \sum_{k=n}^{n+2}\left(\frac{T_{mot\_desired\_est} \cdot \omega_{driver\_est}}{1000}\right)_k \cdot \left(\frac{D}{v}\right)_k \qquad \text{Equation 24}$$

When the virtual SOC gain $SOC_{gam\_optimized\_est}$ for each section is a negative value (e.g., less than zero), the controller 100 may be configured to calculate the expected demand torque $T_{mot\_desired\_est}$ of the motor 20 for each section using the following Equation 25. In particular, the expected demand torque $T_{mot\_desired\_est}$ of the motor 20 may have a positive value (e.g., greater than zero).

$$(T_{mot\_desired\_est})_k \overset{n+2}{\underset{k=n}{}} = -(SOC_{gain\_optimized\_est})_k \Big/ \qquad \text{Equation 25}$$

$$\left(\frac{\omega_{driver\_est} \cdot \eta_{discharge} \cdot D}{1000 \cdot 3600 \cdot v \cdot P_{battery\_nominal}}\right)_k \cdot 100$$

When the virtual SOC gain $SOC_{gain\_optimized\_est}$ for each section is a positive value, the controller 100 may be configured to calculate the expected demand torque $T_{mot\_desired\_est}$ of the motor 20 for each section using Equation 26. In particular, the expected demand torque $T_{mot\_desired\_est}$ of the motor 20 may have a negative value.

$$(T_{mot\_desired\_est})_k \Big|_{k=n}^{n+2} = -(SOC_{gain\_optimized\_est})_k \Big/ \left(\frac{\omega_{driver\_est} \cdot \eta_{charge} \cdot D}{1000 \cdot 3600 \cdot v \cdot P_{battery\_nominal}}\right)_k \cdot 100 \quad \text{Equation 26}$$

As shown in FIG. 4B and FIG. 4C, accumulated driving work in the three sections calculated with reference to the optimal operating point of the engine 10 and accumulated driving work to minimize the driving energy of the hybrid electric vehicle are about the same. However, according to the method of determining the design variables to satisfy the objective function and the constraint functions, accumulated work of the engine 10 in the three sections may be less than the calculation of an SOC trend line with reference to the optimal operating point of the engine 10. Particularly, loss of the driving energy may occur when calculating the SOC trend line only based on the optimal operating point of the engine 10, while when determining the design variables for satisfying the objective function and the constraint functions, the driving energy may be optimized.

Furthermore, the controller 100 may be configured to calculate an expected demand torque $T_{eng\_desired\_est}$ of the engine 10 for each section based on the expected demand torque $T_{driver\_est}$ of the driver for each section and the expected demand torque $T_{mot\_desired\_est}$ of the motor 20 using the following Equation 27 at step S280.

$$(T_{eng\_desired\_est})_k \Big|_{k=n}^{n+2} = (T_{driver\_est})_k - (T_{mot\_desired\_est})_k \quad \text{Equation 27}$$

The controller 100 may be configured to determine an expected driving mode of the hybrid electric vehicle based on the expected demand torque $T_{driver\_est}$ of the driver for each section, the expected demand torque $T_{eng\_desired\_est}$ of the engine 10 for each section, and the expected demand torque $T_{mot\_desired\_est}$ of the motor 20 for each section at step S290.

In particular, the expected driving mode of the hybrid electric vehicle may be determined as in the following table 1.

TABLE 1

| Expected torque of driver ($T_{driver\_est}$) | Expected demand torque of engine ($T_{eng\_desired\_est}$) | Expected demand torque of the motor ($T_{mot\_desired\_est}$) | Expected driving mode |
|---|---|---|---|
| $T_{driver\_est} \leq 0$ | $T_{eng\_desired\_est} > 0$ | $T_{mot\_desired\_est} < 0$ | HEV mode |
| | $T_{eng\_desired\_est} = 0$ | $T_{mot\_desired\_est} \leq 0$ | EV mode |
| $T_{driver\_est} > 0$ | $T_{eng\_desired\_est} > 0$ | $T_{mot\_desired\_est} < 0$ | HEV mode |
| | $T_{eng\_desired\_est} > 0$ | $T_{mot\_desired\_est} = 0$ | Engine mode |
| | $T_{eng\_desired\_est} > 0$ | $T_{mot\_desired\_est} > 0$ | HEV mode |
| | $T_{eng\_desired\_est} = 0$ | $T_{mot\_desired\_est} > 0$ | EV mode |

The controller 100 may be configured to determine a first threshold line $SOC_{forced\_charge\_threshold}$ and a second threshold line $SOC_{passive\_charge\_threshold}$ based on the second virtual SOC trend line $SOC_{target\_virtual}$, the average effective gradient for each section, and the average effective vehicle speed for each section at step S300.

As shown in FIG. 5A to FIG. 5D, the controller 100 may be configured to divide an entire SOC area into three areas based on the first threshold line $SOC_{forced\_charge\_threshold}$ and the second threshold line $SOC_{passive\_charge\_threshold}$. The three ranges may include an active charging area, a forced charging area, and a passive charging area. The active charging area may be an area between the first threshold line $SOC_{forced\_charge\_threshold}$ and the second threshold line $SOC_{passive\_charge\_threshold}$ the force charging area may be an area less than the first threshold line $SOC_{forced\_charge\_threshold}$, and the passive charging area may be an area greater than the second threshold line $SOC_{passive\_charge\_threshold}$. As shown in FIG. 2B, the controller 100 may be configured to operate the engine 10 and the motor 20 using the expected driving mode of the hybrid electric vehicle, the first threshold line $SOC_{forced\_charge\_threshold}$, and the second threshold line $SOC_{passive\_charge\_threshold}$.

The controller 100 may further be configured to determine whether a current SOC of the battery 50 is within the predetermined SOC area (i.e., between the first threshold line and the second threshold line) at step S310. When the current SOC of the battery 50 is within the predetermined SOC area at step S300, the controller 100 may be configured to operate the engine 10 and the motor 20 based on the expected driving mode at step S310. In particular, the controller 100 may be configured to calculate a difference $T_{driver\_err\_current}$ between an actual demand torque $T_{driver\_act\_current}$ of the driver at a current time and the expected demand torque $T_{driver\_est}$ of the driver in a current section using the following Equation 28.

$$T_{driver\_err\_current} = T_{driver\_actual\_current} - (T_{driver\_est})_k \quad \text{Equation 28}$$

The controller 100 may be configured to calculate a demand torque $T_{mot\_desired\_current}$ of the motor 20 at the current time based on the difference $T_{driver\_err\_current}$ and the expected demand torque $T_{mot\_desired\_est}$ of the motor 20 at the current section.

$$T_{mot\_desired\_current} = (T_{mot\_desired\_est})_k + T_{driver\_err\_current} \quad \text{Equation 29}$$

The controller 100 may be configured to calculate a demand torque $T_{eng\_desired\_current}$ of the engine 10 at the current time based on the actual demand torque $T_{driver\_act\_current}$ of the driver at the current time and the demand torque $T_{mot\_desired\_current}$ of the motor 20 at the current time.

$$T_{eng\_desired\_current} = T_{driver\_actual\_current} - T_{mot\_desired\_current} \quad \text{Equation 30}$$

The controller 100 may then be configured to operate the engine 10 and the motor 20 based on the demand torque $T_{eng\_desired\_current}$ of the engine 10 at the current time and the demand torque $T_{mot\_desired\_current}$ of the motor 20 at the current time. In other words, when the current SOC of the battery 50 is between the first threshold line and the second threshold line, by operating the hybrid electric vehicle based on the expected driving mode, frequent mode switching of the hybrid vehicle may be prevented.

When the current SOC of the battery 50 is less than the first threshold line $SOC_{forced\_charge\_threshold}$ at step 320, the controller 100 may be configured to calculate a first delta SOC which is a difference between the current SOC of the battery 50 and the first threshold line $SOC_{forced\_charge\_threshold}$ at step S330. The first delta SOC may have a negative value. The controller 100 may be configured to calculate a first correction value $T_{forced\_charge\_correction}$ based on the first delta SOC at step S340. The first correction value $T_{forced\_charge\_correction}$ may have a negative value.

Additionally, the controller 100 may be configured to perform charging-oriented control for charging the battery 50 using the first correction value $T_{forced\_charge\_correction}$ at step S350. In particular, the controller 100 may be configured to calculate a corrected demand torque $T_{mot\_desired\_corrected}$ of the motor 20 at the current time based on the demand torque $T_{mot\_desired\_current}$ of the motor 20 at the current time and the first correction value $T_{forced\_charge\_correction}$ using the following Equation 31.

$$T_{mot\_desired\_corrected} = T_{mot\_desired\_current} + T_{forced\_charge\_correction} \qquad \text{Equation 31}$$

The controller 100 may be configured to calculate a corrected demand torque $T_{eng\_desired\_corrected}$ of the engine 10 at the current time based on the actual demand torque $T_{driver\_act\_current}$ of the driver at the current time and the corrected demand torque $T_{mot\_desired\_corrected}$ of the motor 20. The controller 100 may then be configured to operate the engine 10 and the motor 20 based on the corrected demand torque $T_{eng\_desired\_corrected}$ of the engine 10 and the corrected demand torque $T_{mot\_desired\_corrected}$ of the motor 20 at the current time.

When the current SOC of the battery 50 is greater than the second threshold line $SOC_{passive\_charge\_threshold}$ at step S320, the controller 100 may be configured to calculate a second delta SOC which is difference between the current SOC of the battery 50 and the second threshold line $SOC_{passive\_charge\_threshold}$ at step S360. The second delta SOC may have a positive value. The controller 100 may be configured to calculate a second correction value $T_{passive\_charge\_correction}$ based on the second delta SOC at step S370. The second correction value $T_{passive\_charge\_correction}$ may have a positive value. The controller 100 may then be configured to perform discharging-oriented control to discharge the battery 50 using the second correction value $T_{passive\_charge\_correction}$ at step S360. In particular, the controller 100 may be configured to calculate a corrected demand torque $T_{mot\_desired\_corrected}$ of the motor 20 at the current time based on the demand torque $T_{mot\_desired\_current}$ of the motor 20 at the current time and the second correction value $T_{passive\_charge\_correction}$ using the following Equation 32.

$$T_{mot\_desired\_corrected} = T_{mot\_desired\_current} + T_{passive\_charge\_correction} \qquad \text{Equation 32}$$

The controller 100 may be configured to calculate a corrected demand torque $T_{eng\_desired\_corrected}$ of the engine 10 at the current time based on the actual demand torque $T_{driver\_act\_current}$ of the driver at the current time and the corrected demand torque $T_{mot\_desired\_corrected}$ of the motor 20. The controller 100 may then be configured to operate the engine 10 and the motor 20 based on the corrected demand torque $T_{eng\_desired\_corrected}$ of the engine 10 and the corrected demand torque $T_{mot\_desired\_corrected}$ of the motor 20 at the current time.

As described above, according to an exemplary embodiment of the present invention, driving energy of the hybrid electric vehicle in the entire route may be optimized. In addition, by operating the hybrid electric vehicle based on the expected driving mode when the current SOC of the battery 50 is within the predetermined SOC, frequent mode switching of the hybrid electric vehicle may be prevented. Further, it may be possible to reduce the communication load between the navigation device 91 and the controller 100 and the calculation load of the controller 100.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method of controlling a hybrid electric vehicle, comprising:
    setting, by a controller, a route from a current position of the hybrid electric vehicle toward a destination;
    setting, by the controller, a plurality of sections based on information regarding an altitude of the route;
    calculating, by the controller, an expected driving force for each section based on a distance for each section, an average effective gradient for each section, and an average effective vehicle speed for each section;
    determining, by the controller, an expected gear stage for each section based on the average effective gradient for each section and the average effective vehicle speed for each section;
    calculating, by the controller, an expected demand torque of a driver for each section based on the expected driving force for each section and the expected gear stage for each section;
    calculating, by the controller, an expected input speed of a transmission for each section based on the average effective vehicle speed for each section and the expected gear stage for each section;
    calculating, by the controller, a demand torque of an engine for each section and a demand torque of a motor for each section from the expected demand torque of the driver for each section with reference to an optimal operating point of the engine;
    calculating, by the controller, demand power of the motor for each section based on the demand torque of the motor for each section calculated with reference to the optimal operating point of the engine and the expected input speed of the transmission for each section;
    calculating, by the controller, a state of charge (SOC) gain for each section based on the demand power of the motor for each section calculated with reference to the optimal operating point of the engine;
    calculating, by the controller, a first virtual SOC trend line for each section based on the SOC gain for each section calculated with reference to the optimal operating point of the engine;
    calculating, by the controller, an available torque of the motor for each section based on the first virtual SOC trend line and the expected input speed of the transmission for each section;
    calculating, by the controller, a limit of the available torque of the motor for each section based on the expected demand torque of the driver for each section and the available torque of the motor for each section;
    calculating, by the controller, an available SOC for each section based on the limit of the available torque of the motor for each section;
    setting, by the controller, an objective function for minimizing accumulated work of the engine in the plurality of sections;
    setting, by the controller, constraint functions of a second virtual SOC trend line to minimize the accumulated work of the engine in the plurality of sections, an expected demand torque of the motor for each section, an expected demand torque of the engine, and accumulated driving work in the plurality of sections;

determining, by the controller, design variables that satisfy the objective function and the constraint functions, wherein the design variables include the second virtual SOC trend line, the expected demand torque of the motor for each section, and the accumulated work of the motor in the plurality of sections;

calculating, by the controller, the expected demand torque of the engine for each section based on the expected demand torque of the driver for each section and the expected demand torque of the motor for each section;

determining, by the controller, an expected driving mode of the hybrid electric vehicle for each section based on the expected demand torque of the driver for each section, the expected demand torque of the engine for each section, and the expected demand torque of the motor for each section;

determining, by the controller, a first threshold line and a second threshold line based on the second virtual SOC trend line, the average effective gradient for each section, and the average effective vehicle speed for each section; and operating, by the controller, the engine and the motor using the expected driving mode of the hybrid electric vehicle, the first threshold line, and the second threshold line.

2. The method of claim 1, wherein the operating of the engine and the motor using the expected driving mode of the hybrid electric vehicle, the first threshold line, and the second threshold line includes:

determining, by the controller, whether a current SOC of a battery is between the first threshold line and the second threshold line;

when the current SOC of the battery is between the first threshold line and the second threshold line, calculating, by the controller, a demand torque of the motor at a current time based on a difference between an actual demand torque of the driver at the current time and the expected demand torque of the driver in a current section and the expected demand torque of the motor in the current section;

calculating, by the controller, a demand torque of the engine at the current time based on the actual demand torque of the driver at the current time and a demand torque of the motor at the current time; and operating, by the controller, the engine and the motor based on the demand torque of the engine at the current time and the demand torque of the motor at the current time.

3. The method of claim 2, wherein the operating of the engine and the motor using the expected driving mode of the hybrid electric vehicle, the first threshold line, and the second threshold line includes:

when the current SOC of the battery is less than the first threshold line, calculating, by the controller, a first delta SOC which is a difference between the current SOC of the battery and the first threshold line;

calculating, by the controller, a first correction value based on the first delta SOC; and performing, by the controller, a charging-oriented control to charge the battery using the first correction value.

4. The method of claim 3, wherein the performing of the charging-oriented control for charging the battery by using the first correction value includes:

calculating, by the controller, a corrected demand torque of the motor at the current time based on the demand torque of the motor at the current time and the first corrections value;

calculating, by the controller, a corrected demand torque of the engine at the current time based on the actual demand torque of the driver at the current time and the corrected demand torque of the motor at the current time; and operating, by the controller, the engine and the motor based on the corrected demand torque of the engine at the current time and the corrected demand torque of the motor at the current time.

5. The method of claim 2, wherein the operating of the engine and the motor using the expected driving mode of the hybrid electric vehicle, the first threshold value and the second threshold value includes:

when the current SOC is greater than the second threshold line, calculating, by the controller, a second delta SOC which is difference between the current SOC of the battery and the second threshold line;

calculating, by the controller, a second correction value based on the second delta SOC; and performing, by the controller, discharging-oriented control to discharge the battery using the second correction value.

6. The method of claim 5, wherein the performing of the discharging-oriented control to discharge the battery by using the second correction value includes:

calculating, by the controller, a corrected demand torque of the motor at the current time based on the demand torque of the motor at the current time and the second correction value;

calculating, by the controller, a corrected demand torque of the engine at the current time based on the actual demand torque of the driver at the current time and the corrected demand torque of the motor at the current time; and operating, by the controller, the engine and the motor based on the corrected demand torque of the engine at the current time and the corrected demand torque of the motor at the current time.

7. The method of claim 1, wherein the average effective gradient for each section is calculated by linearizing altitude by extracting extremums of the altitude.

8. The method of claim 1, wherein the average effective vehicle speed is calculated based on information regarding a speed limit of the route and information regarding a traffic vehicle speed of the route.

9. The method of claim 1, wherein the SOC gain for each section includes a discharging SOC gain for each section and a charging SOC gain for each section, when the demand torque of the motor for each section calculated with reference to the optimal operating point of the engine is a positive value, the discharging SOC gain for each section is calculated based on the demand power of the motor for each section, discharging efficiency of the motor, the distance for each section, the average effective vehicle speed for each section, and a nominal power of the battery, and when the demand torque of the motor for each section calculated with reference to the optimal operating point of the engine is a negative value, the charging SOC gain for each section is calculated based on the demand power of the motor for each section, charging efficiency of the motor, the distance for each section, the average effective vehicle speed for each section, and the nominal power of the battery.

10. The method of claim 1, wherein the available torque of the motor for each section includes a discharging available torque of the motor for each section and a charging available torque of the motor for each section, the discharging available torque of the motor for each section is calculated based on the SOC of the battery at a start point for each section calculated with reference to the optimal operating point of the engine, a minimum limit of the SOC of the battery, the expected input speed of the transmission for each section, discharging efficiency of the motor, the distance for each section, the average effective vehicle speed for each section, and a nominal power of the battery, and the charging available torque of the motor for each section is calculated based on the SOC of the battery at the start point for each section calculated with reference to the optimal operating point of the engine, a maximum limit of the SOC of the battery, the expected input speed of the transmission, charging efficiency of the motor, the distance for each section, the average effective vehicle speed for each section, and the nominal power of the battery.

11. The method of claim 10, wherein a limit of the available torque of the motor for each section includes a limit of the discharging available torque of the motor for each section and a limit of the charging available torque of the motor for each section, the limit of the discharging available torque of the motor for each section is calculated based on the discharging available torque of the motor for each section and the expected demand torque of the driver for each section, and the limit of the charging available torque of the motor for each section is calculated based on the charging available torque of the motor for each section and the expected demand torque of the driver for each section.

12. The method of claim 11, wherein the available SOC for each section includes a discharging available SOC for each section and a charging available SOC for each section, the discharging available SOC for each section is calculated based on the limit of the discharging available torque of the motor for each section, and the charging available SOC for each section is calculated based on the limit of the charging available torque of the motor for each section.

13. The method of claim 12, wherein the constraint function of the second virtual SOC trend line is set based on the minimum limit of the SOC of the battery, the discharging available SOC for each section, the charging available SOC for each section, and the maximum limit of the SOC of the battery.

14. The method of claim 12, wherein the constraint function of the expected demand torque of the motor for each section is set based on a minimum torque capable of being output by the motor, the limit of the discharging available torque of the motor for each section, the limit of the charging available torque of the motor for each section, and a maximum torque capable of being output by the motor.

15. An apparatus for controlling a hybrid electric vehicle, comprising:

a navigation device configured to provide information regarding a road gradient, a speed limit, and a traffic speed of a road;

an accelerator pedal position detector configured to detect a position of an accelerator pedal;

a brake pedal position detector configured to detect a position of a brake pedal;

a vehicle speed detector configured to detect a vehicle speed;

a state of charge (SOC) detector configured to detect an SOC of a battery;

a gear stage detector configured to detect a currently engaged gear stage; and a controller configured to operate the hybrid vehicle based on signals of the navigation device, the accelerator pedal position detector, the brake pedal position detector, the vehicle speed detector, the SOC detector, and the gear stage detector, wherein the controller is further configured to:

set a route from a current position of the hybrid electric vehicle toward a destination;

set a plurality of sections based on information regarding an altitude of the route;

calculate an expected driving torque for each section based on a distance for each section, an average effective gradient for each section, and an average effective vehicle speed for each section;

determine an expected gear stage for each section based on the average effective gradient for each section and the average effective vehicle speed for each section;

calculate an expected demand torque of a driver for each section based on the expected driving torque for each section and the expected gear stage for each section;

calculate an expected input speed of a transmission for each section based on the average effective vehicle speed for each section and the expected gear stage for each section;

calculate a demand torque of an engine for each section and a demand torque of a motor for each section from the expected demand torque of the driver for each section with reference to an optimal operating point of the engine;

calculate a demand power of the motor for each section based on the demand torque of the motor for each section calculated with reference to the optimal operating point of the engine and the expected input speed of the transmission for each section;

calculate a state of charge (SOC) gain for each section based on the demand power of the motor for each section calculated with reference to the optimal operating point of the engine;

calculate a first virtual SOC trend line for each section based on the SOC gain for each section calculated with reference to the optimal operating point of the engine;

calculate an available torque of the motor for each section based on the first virtual SOC trend line and the expected input speed of the transmission for each section;

calculate a limit of the available torque of the motor for each section based on the expected demand torque of the driver for each section and the available torque of the motor for each section;

calculate an available SOC for each section based on the limit of the available torque of the motor for each section;

set an objective function to minimize accumulated work of the engine in the plurality of sections;

set constraint functions of a second virtual SOC trend line to minimize the accumulated work of the engine in the plurality of sections, an expected demand torque of the motor for each section, an expected demand torque of the engine, and accumulated driving work in the plurality of sections;

determine design variables that satisfy the objective function and the constraint functions, wherein the design variables includes the second virtual SOC trend line, the expected demand torque of the motor for each section, and the accumulated work of the motor in the plurality of sections;

calculate the expected demand torque of the engine for each section based on the expected demand torque of the driver for each section and the expected demand torque of the motor for each section;

determine an expected driving mode of the hybrid electric vehicle for each section based on the expected demand torque of the driver for each section, the expected demand torque of the engine for each section, and the expected demand torque of the motor for each section;

determine a first threshold line and a second threshold line based on the second virtual SOC trend line, the average effective gradient for each section, and the average effective vehicle speed for each section; and operate the engine and the motor by using the expected driving mode of the hybrid electric vehicle, the first threshold line, and the second threshold line.

16. The apparatus of claim 15, wherein in the operation of the engine and the motor using the expected driving mode of the hybrid electric vehicle, the first threshold line, and the second threshold line the controller is further configured to:

determine whether a current SOC of a battery is between the first threshold line and the second threshold line;

when the current SOC of the battery is between the first threshold line and the second threshold line, calculate a demand torque of the motor at a current time based on a difference between an actual demand torque of the driver at the current time and the expected demand torque of the driver in a current section and the expected demand torque of the motor in the current section;

calculate a demand torque of the engine at the current time based on the actual demand torque of the driver at the current time and a demand torque of the motor at the current time; and operate the engine and the motor based on the demand torque of the engine at the current time and the demand torque of the motor at the current time.

17. The apparatus of claim 16, wherein in the operation of the engine and the motor using the expected driving mode of the hybrid electric vehicle, the first threshold line, and the second threshold line the controller is further configured to:

when the current SOC of the battery is less than the first threshold line, calculate a first delta SOC which is a difference between the current SOC of the battery and the first threshold line;

calculate a first correction value based on the first delta SOC; and perform a charging-oriented control to charge the battery using the first correction value.

18. The apparatus of claim 17, wherein in the performing of the charging-oriented control for charging the battery by using the first correction value the controller is further configured to:

calculate a corrected demand torque of the motor at the current time based on the demand torque of the motor at the current time and the first corrections value;

calculate a corrected demand torque of the engine at the current time based on the actual demand torque of the driver at the current time and the corrected demand torque of the motor at the current time; and operate the engine and the motor based on the corrected demand torque of the engine at the current time and the corrected demand torque of the motor at the current time.

\* \* \* \* \*